United States Patent
Papamanthou et al.

(10) Patent No.: US 8,726,034 B2
(45) Date of Patent: May 13, 2014

(54) CRYPTOGRAPHIC ACCUMULATORS FOR AUTHENTICATED HASH TABLES

(75) Inventors: Charalampos Papamanthou, Providence, RI (US); Roberto Tamassia, Providence, RI (US); Nikolaos Triandopoulos, Arlington, MA (US)

(73) Assignee: Brown University, Providence, RI (US)

( * ) Notice: Subject to any disclaimer, the term of this patent is extended or adjusted under 35 U.S.C. 154(b) by 287 days.

(21) Appl. No.: 12/737,887

(22) PCT Filed: Aug. 28, 2009

(86) PCT No.: PCT/US2009/004912
§ 371 (c)(1),
(2), (4) Date: May 18, 2011

(87) PCT Pub. No.: WO2010/024931
PCT Pub. Date: Mar. 4, 2010

(65) Prior Publication Data
US 2011/0225429 A1 Sep. 15, 2011

Related U.S. Application Data

(60) Provisional application No. 61/190,479, filed on Aug. 29, 2008.

(51) Int. Cl.
*G06F 21/00* (2013.01)
(52) U.S. Cl.
USPC .......................................................... 713/189
(58) Field of Classification Search
USPC .......................................................... 713/189
See application file for complete search history.

(56) References Cited

U.S. PATENT DOCUMENTS

| 4,309,569 | A | | 1/1982 | Merkle | |
|---|---|---|---|---|---|
| 4,868,743 | A | * | 9/1989 | Nishio | 1/1 |
| 5,568,640 | A | * | 10/1996 | Nishiyama et al. | 1/1 |

(Continued)

FOREIGN PATENT DOCUMENTS

| EP | 0 932 109 A2 | 7/1999 |
|---|---|---|
| WO | WO 02/39212 A2 | 5/2002 |

(Continued)

OTHER PUBLICATIONS

Ateniese, et al., "Provable data possession at untrusted stores", (2007), (pp. 598-610).

(Continued)

*Primary Examiner* — Krisna Lim
(74) *Attorney, Agent, or Firm* — Merchant & Gould P.C.

(57) ABSTRACT

In one exemplary embodiment, an apparatus includes a memory storing data and a processor performing operations. The apparatus generates or maintains an accumulation tree for the stored data—an ordered tree structure with a root node, leaf nodes and internal nodes. Each leaf node corresponds to a portion of the data. A depth of the tree remains constant. A bound on a degree of each internal node is a function of a number of leaf nodes of a subtree rooted at the internal node. Each node of the tree has an accumulation value. Accumulation values of the root and internal nodes are determined by hierarchically employing an accumulator over the accumulation values of the nodes lying one level below the node in question. The accumulation value of the root node is a digest for the tree.

17 Claims, 4 Drawing Sheets

(56) References Cited

U.S. PATENT DOCUMENTS

| | | | |
|---|---|---|---|
| 6,356,902 B1* | 3/2002 | Tan et al. | 1/1 |
| 7,130,467 B1 | 10/2006 | Bronder et al. | 382/218 |
| 7,627,604 B2* | 12/2009 | Furusho | 1/1 |
| 7,974,221 B2 | 7/2011 | Tamassia et al. | 370/256 |
| 8,156,430 B2* | 4/2012 | Newman | 715/255 |
| 2007/0250937 A1 | 10/2007 | Ginter et al. | 726/27 |

FOREIGN PATENT DOCUMENTS

| | | |
|---|---|---|
| WO | WO 2008/014002 A2 | 1/2008 |
| WO | WO 2008/014004 A2 | 1/2008 |
| WO | WO 2008/014007 A2 | 1/2008 |
| WO | WO 2010/011342 A1 | 1/2010 |

OTHER PUBLICATIONS

Baric et al., "Collision-Free Accumulators and Fail-Stop Signature Schemes Without Trees", In Advances in Cryptology: Proc. EUROCRYPT, vol. 1233 of LNCS, 1997, pp. 480-494.

Bellare et al., "Random Oracles are Practical: A Paradigm for Designing Efficient Protocols", In Proceedings of the $1^{st}$ ACM Conference on Computer and Communications Security, 1993, pp. 62-73.

Benaloh, et al., "One-Way Accumulatos" A Decentralized Alternative to Digital Signatures (Extended Abstract), In Advances in Cryptology-EUROCRYPT 93, vol., 765 of LNCS, 1993, pp. 274-285.

Blum, et al., "Checking the Correctness of Memories", Algorithmica, (1994), (pp. 225-244).

Boneh et al., "Short Signatures Without Random Oracles and the SDH Assumption in Bilinear Groups", J. Crypotology, 21(2), 2008, pp. 149-177.

Buldas, et al., "Accountable Certificate Management using Undeniable Attestations", In ACM Conference on Computer and Communications Security, 2000, pp. 9-18.

Camenisch et al., "An Accumulator Based on Bilinear Maps and Efficient Revocation for Anonymous Credentials", In Public Key Cryptography (PKC), 2009, pp. 481-500.

Camenisch et al., "Dynamic Accumulators and Application to Efficient Revocation of Anonymous Credentials", In Proc. CRYPTO, 15 pgs., 2002.

Carter et al., "Universal Classes of Hash Functions", In Proc. ACM Symp. on Theory of Computing, 1977, pp. 106-112.

Dietzfelbinger et al., "Dynamic Perfect Hashing: Upper and Lower Bounds", SIAM J. Comput. 23, 1994, pp. 738-761.

Dwork, et al., "How efficient can memory checking be?", TCC 2009, pp. 503-520.

Erway et al., "Dynamic Provable Data Possession", In Proc. ACM Int. Confeence on Computer and Communications Security, 2009, 10 pgs.

Gennaro et al., "Secure Hash-and-Sign Signatures without the Random Oracle", In Proc. EUROCRYPT, vol. 1592 of LNCS, 1999, pp. 123-139.

Goodrich, et al., "On the Cost of Persistence and Authentication in Skip Lists", In Proc. Int. Workshop on Experimental Algorithms (WEA), 2007, pp. 94-107.

Goodrich, et al., "Athos: Efficient authentication of outsourced file systems", In *ISC*, (2008), (pp. 80-96).

Goodrich, et al., "An Efficient Dynamic and Distributed Cryptographic Accumulator", In Proc. of Information Security Conference (ISC), vol. 2433 of LNCS, 2002, pp. 372-388.

Goodrich, et al., "Implementation of an authenticated dictionary with skip lists and commutative hashing", In *DISCEX II*, (2001), (pp. 68-82).

Goodrich, et al., "Super-Efficient Verification of Dynamic Outsourced Databases", In Proc. RSA Conference, Cryptographers' Track (CT-RSA), vol. 4964 of LNCS, 2008, pp. 407-424.

Goodrich, et al., Authenticated Data Structures for Graph and Geometric Searching, In Proc. RSA Conference-Cryptographers' Track, LNCS 2612, 2003, pp. 295-313.

Hutflesz et al., "Globally Order Preserving Multidimensional Linear Hashing", In Proc. $4^{th}$ Intl. Conf. on Data Engineering, 1988, pp. 572-579.

Kenyon, et al., "Maximum Queue Size and Hashing with Lazy Deletion", Algorithmica, 1991, pp. 597-619.

Li, et al., "Universal Accumulators with Efficient Nonmembership Proofs", In ACNS, 2007, pp. 253-269.

Linial, et al., "Non-Expanisive Hashing", In Proc. $28^{th}$ Annu. ACM Sympos. Theory Comput., 1996, pp. 509-517.

Lynn, B., "On the Implementation of Pairing-Based Cryptosystems", PhD thesis, Stanford University, Nov. 2008, 126 pgs.

Martel, et al., "A General Model for Authenticated Data Structures", Algorithmica, 39,2004, pp. 21-41.

Merkle, R.C., "A Certified Digital Signature", In G. Brassard, editor, Proc. CRYPTO '89, vol. 435 of LNCS, 1989, pp. 218-238.

Mullin, J. K., "Spiral Storage" Efficient Dynamic Hashing with Constant Peformance, Comput. J., 28, 1985, pp. 330-334.

Naor, et al., "Certificate revocation and certificate update". In *USENIX Security*, (1998), (pp. 17-17).

Naor, et al., "The complexity of online memory checking". In *FOCS*, (2005), (pp. 573-584).

Nguyen, L., "Accumulators from Bilinear Pairings and Applications", In Proc. CT-RSA, LNCS 3376, 2005, pp. 275-292.

Nuckolls, G., "Verified Query Results from Hybrid Authentication Trees", in DBSec, 2005, pp. 84-98.

Papamanthou, et al., "Time and space efficient algorithms for two-party authenticated data structures", In *ICICS*, (2007), (pp. 1-15).

Sander, T., "Efficient Accumulators without Trapdoor Extended Abstract", In ICICS '99 Proc. Int. Conf. on Information and Communication Security. 1999, pp. 252-262.

Sander, et al., "Blind, Auditable Membership Proofs", In Proc. Financial Cryptography (FC 2000), vol. 1962 of LNCS, 2001, pp. 53-71.

Tamassia, "Authenticated data structures", In *ESA*, (2003), (pp. 2-5).

Tamassia, et al., "Computational bounds on hierarchical data processing with applications to information security" (2005), (pp. 153-165).

Tamassia, et al., "Efficient Content Authentication in Peer-to-Peer Networks", In Proc. Int. Conf. on Applied Crytography and Network Security (ACNS). vol. 4521 of LNCS, 2007, pp. 354-372.

Wang, et al., "A New Dynamic Accumulator for Batch Updates", In *ICICS*, 2007, pp. 98-112.

European Search Report for 09810385.6 mailed Nov. 7, 2013.

* cited by examiner

CRYPTOGRAPHIC ACCUMULATORS FOR AUTHENTICATED HASH TABLES

CROSS-REFERENCE TO RELATED APPLICATIONS

This patent application claims priority from U.S. Provisional Patent Application No. 61/190,479, filed Aug. 29, 2008, and from International Application No. PCT/US2009/004912, filed Aug. 28, 2009, which published on Mar. 4, 2010, as WIPO Publication No. WO2010/024931.

STATEMENT REGARDING FEDERALLY SPONSORED RESEARCH OR DEVELOPMENT

This invention was made with government support under grants IIS-0713403 and OCI-0724806, awarded by the National Science Foundation (NSF). The government has certain rights in the invention.

TECHNICAL FIELD

The exemplary embodiments of this invention relate generally to data storage and access and, more specifically, relate to access, security and updates for data stored by an untrusted agent (e.g., an untrusted remote server).

BACKGROUND

Online storage of data (e.g., Amazon's S3 storage service) is becoming increasingly popular for both corporations and consumers. Clients can create virtual drives consisting of online storage units that are operated by remote and geographically dispersed servers. In addition to being a convenient solution for data archiving or backups, remote storage allows for load-balanced distributed data management (e.g., database outsourcing). Large data volumes can become available to end applications through high-bandwidth connections to the data-hosting servers, which can rapidly answer queries arriving at high rates. In such a manner, data sources need to be online only when they wish to update their published data.

In several settings, the ability to check the integrity of remotely stored data is an important security property. Namely, one would like to detect both data corruption caused by a faulty server (e.g., because of hardware issues or software errors) and data tampering performed by an attacker that compromises the server (e.g., deliberate deletion or modification of files). Without some kind of verification mechanism, errors and attacks cannot be detected, no matter what trust relations the client and the server may a priori share.

Hash tables are fundamental data structures that optimally answer membership queries. Suppose a client stores n elements in a hash table that is outsourced at a remote server. Authenticating the hash table functionality, i.e., verifying the correctness of queries answered by the server and ensuring the integrity of the stored data, is crucial because the server, lying outside the administrative control of the client, can be malicious.

SUMMARY

In one exemplary embodiment of the invention, an apparatus comprising: at least one memory configured to store data; and at least one processor configured to perform operations on the stored data, where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

In another exemplary embodiment, a method comprising: storing data using at least one memory; and performing, by at least one processor, operations on the stored data, where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

In a further exemplary embodiment, a program storage device readable by a machine, tangibly embodying a program of instructions executable by the machine for performing operations, said operations comprising: storing data; and performing actions on the stored data, where the actions comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

In another exemplary embodiment, an apparatus comprising: means for storing data; and means for performing operations on the stored data, the operations comprising at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

1. Introduction

Figure 1:
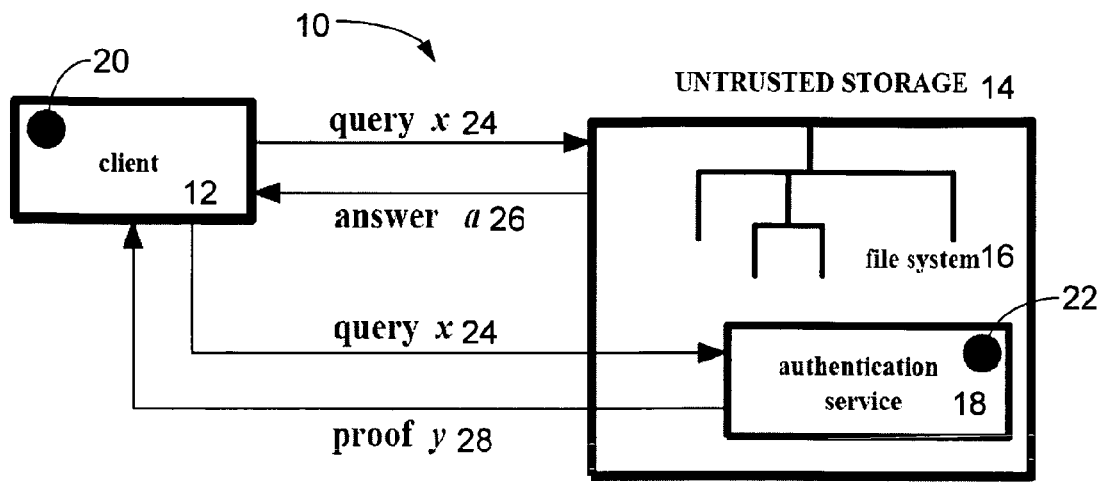
FIG. 1 shows a schematic illustration of an exemplary authenticated storage model within which exemplary embodiments of the invention may be utilized.

Thus, it is desirable that operations on remote data be authenticated. That is, answers to client queries should be verified and either validated to be correct or rejected because they do not reflect the true state of the client's outsourced data.

Herein, a fundamental data authentication problem is considered, where one wishes to authenticate membership queries over a dynamic set of n data elements stored in a hash table maintained by an untrusted server. Used by numerous applications, hash tables are simple and efficient data structures for answering set-membership queries optimally, in expected constant time. It is therefore important in practice, and also theoretically interesting, to authenticate their functionality.

Following a standard approach, the hash table is augmented with an authentication structure that uses a cryptographic primitive to define a succinct (e.g., a few bytes long) and secure digest, a "fingerprint" of the entire stored set. Computed on the correct data, this digest will serve as a secure set description subject to which the answer to a (non-)membership query will be verified at the client by means of a corresponding proof that is provided by the server. The main goal is to design protocols that implement this methodology both securely, against a computationally bounded server (e.g., a malicious server), and efficiently, with respect to communication and computation overheads incurred due to the hash-table authentication.

In particular, one wishes to minimize the amount of authentication information sent by the data source to the server to perform an update and also the size of the proof sent by the server to the client to demonstrate the correctness of the answer—ideally, one would like to keep both complexities constant. Analogously, since client-side applications may connect to the server from mobile devices with limited computing power and/or slow connectivity (e.g., cell-phones), one would like to make the verification computation performed by the client as efficient as possible, ideally with complexity that is independent of the size of the set. More importantly, one wishes to preserve the optimal query complexity of the hash table, while keeping the costs due to set updates sublinear in the set's size: ideally, the server should authenticate (non-)membership queries in constant time, or otherwise one loses the optimal property that hash tables offer.

Developing secure protocols for hash tables that authenticate (non-)membership queries in constant time has been a long-standing open problem [32]. Using cryptographic (collision resistant) hashing and Merkle's tree construction [30] to produce the set digest, (non-)membership queries in sets can be authenticated with logarithmic costs (e.g., 7, 21, 32, 37, 42]), which is optimal for any hash-based approach, as it has been shown in [41]. Breaking this logarithmic barrier, therefore, requires employing an alternative cryptographic primitive. One-way accumulators and their dynamic extensions [4, 6, 10, 11, 34] are constructions for accumulating a set of n elements into a short value, subject to which each accumulated element has a short witness (proof) that can be used to verify in constant time its membership in the set. Although this property, along with precomputed element witnesses, clearly allows for set-membership verification in O(1) time, it has not been known how this can lead to practical schemes: indeed, straightforward techniques for recomputing the correct witnesses after element updates require at least linear work (O(n) or O(n log n) depending on the accumulator), thus resulting in high update costs at the server.

In the main result discussed herein, it is shown how to use two different accumulator schemes (e.g., [11, 34]) in a hierarchical way over the set and the underlying hash table, to securely authenticate both membership and non-membership queries and fully achieve the complexity goals. That is, in the (exemplary) novel authentication schemes communication and verification costs are constant, the query cost is constant and the update cost is sublinear, realizing the first authenticated hash table with this performance. The exemplary schemes strictly improve upon previous schemes based on accumulators. The security of the protocols is based on two widely accepted assumptions, the strong RSA assumption [4] and the q-strong Diffie-Hellman assumption [8].

Moreover, aiming at authentication solutions that cover a wide application area, the core authentication scheme is instantiated—without sacrificing its performance guarantees—to two concrete, widely-used data authentication models, which are herein referred to as the three parry and two-party authentication models, both closely related to the remote-storage setting.

The three-party model has been used to define the concept of authenticated data structures [32, 40] and involves a trusted source that replicates a data set to one or more untrusted servers, as well as one or more clients that access this data set by querying one of the servers. Along with the answer to a query, a server provides the client with a proof that, when combined with the (authentic) data-set digest, can verify the correctness of the answer. This digest is, periodically or after any update, produced, time-stamped (to defeat replay attacks) and signed by the source (a public key infrastructure, or PKI, is assumed), and is forwarded to the server(s) to be included in any answer sent to a client. This model offers load-balancing and computation outsourcing for data publication applications, therefore the source typically keeps the same data set and authentication structure as the server. This can potentially allow the source to facilitate the server's task by communicating appropriate update authentication information after set updates.

In contrast, the two-party model involves a client that, being simultaneously the data source and the data consumer, fully outsources the data set to an untrusted server, keeping locally only the data-set digest (of constant size), subject to which any operation (e.g., update or query, as executed by the server) on the remotely stored data is verified, again using a corresponding proof provided by the server. This model offers both storage and computation outsourcing, but only the data owner has access to the stored set. Here, the main challenge is to maintain at all times a state (digest) that is consistent with the history of updates, typically requiring more involved authentication structures. This model is related to the memory-checking model [7, 33]. For a detailed description of the models one may refer to [19, 21, 37]. Note that in both of the models (three-party and two-party) one assumes the existence of a public key pk (see Section 2.4) that contains public information available to both the client and the untrusted server (and also to the source for the case of the three-party model). Moreover, in the three-party model, where PKI is used, pk also contains the public key of the signature scheme used by the source, which is used by the client for verification. Finally, note that this public key does not come along with a respective "private" key, as with signature schemes. It simply refers to information that is publicly available (to which the adversary has access), as opposed to information that is crucial for the security of the system and is therefore kept secret from the adversary, such as the trapdoor information.

Finally, to meet the needs of different data-access patterns, in the exemplary solution(s) based on RSA accumulators, one may extend both the three-party and two-party authentication schemes to achieve a reverse performance, i.e., sublinear query cost, but constant update cost. Also, aiming at practical solutions, also provided is a detailed evaluation and performance analysis of the exemplary authentication schemes, discussing many implementation details and showing that, under concrete scenarios and certain standard assumptions related to cryptographic hashing, the exemplary protocols achieve very good performance, scalability and a high degree of practicality.

Efficient and secure protocols are provided for optimally authenticating (non-) membership queries on hash tables, using cryptographic accumulators as the basic security primitive and applying them in a novel hierarchical way over the stored data. Strictly improving upon previous methods, the first construction for authenticating a hash table with constant query cost and sublinear update cost is provided.

The first exemplary solution, based on the RSA accumulator, allows the server to provide a proof of integrity of the answer to a membership query in constant time and supports updates in $O(n^\epsilon \log n)$ time for any fixed constant $0<\epsilon<1$, yet keeping the communication and verification costs constant. It also lends itself to a scheme that achieves different trade-offs—namely, constant update time and $O(n^\epsilon)$ query time.

The second exemplary solution uses an accumulator that is based on bilinear pairings to achieve $O(n^\epsilon)$ update time at the server while keeping all other complexities constant. Both schemes apply to two concrete data authentication models and an experimental evaluation shows good scalability.

TABLE 1

| reference | model | assumption | proof size | update info. | query time | update time | verify time | crypto oper. |
|---|---|---|---|---|---|---|---|---|
| [7, 21, 29, 32, 37] | both | collision resistance | log n | 1 | log n | log n | log n | hashing |
| [3] | 2-party | strong RSA | 1 | NA | 1 | NA | 1 | exp |
| [11, 39] | both | strong RSA | 1 | 1 | 1 | n log n | 1 | exp |
| [34] | both | strong DH | 1 | 1 | 1 | n | 1 | exp, BM |
| [20] | 3-party | strong RSA | 1 | $n^\epsilon$ | $n^\epsilon$ | $n^\epsilon$ | 1 | exp |
| main scheme (a) | both | strong RSA | 1 | 1 | 1 | $n^\epsilon \log n$ | 1 | exp |
| main scheme (b) | both | strong DH | 1 | 1 | 1 | $n^\epsilon$ | 1 | exp, BM |
| extension | both | strong RSA | 1 | 1 | $n^\epsilon$ | 1 | 1 | exp |

Table 1 shows a comparison of existing schemes for membership authentication in a set of size n with respect to techniques used and various complexity measures. Here, $0<\epsilon<1$ is a fixed constant, NA stands for "not applicable", DH for "Diffie-Hellman", exp for "exponentiation" and BM for "bilinear map". All complexity measures refer to n (not the security parameter) and are asymptotic expected values. Allowing sublinear updates and extensions for different update/query trade-offs, the exemplary schemes ("main scheme (a)", "main scheme (b)" and "extension") perform better than existing schemes. Update costs in the exemplary schemes are expected amortized values. In all schemes, the server uses O(n) space and the client uses O(1) space. In the three-party model an additional signature cost is incurred (for the signed digest).

1.1 Contributions

1. A new cryptographic construction is proposed for set-membership verification that is based on combining accumulators in a nested way over a tree of constant depth. The solution is instantiated with two different accumulators, namely the RSA accumulator [4] and the bilinear-map accumulator [34] and the security of the new exemplary schemes is proven based only on widely accepted and used cryptographic assumptions, namely the strong RSA assumption [4] and the q-strong Diffie-Hellman assumption [8];

2. Authenticated hash tables are introduced and it is shown how to exploit the efficiency of hash tables to develop an authenticated data structure supporting both membership and non-membership queries on sets drawn from general (ordered) universes. Solutions are given for authenticating a hash table both in the two-party and three party authentication models;

3. The complexity bounds of previous work are improved upon while still being provably secure. Let $0<\epsilon<1$ be a fixed constant. For the RSA accumulator solution, the query time and the size of the update authentication information are reduced from $O(n^\epsilon)$, as it appears in [20], (previously, the best known upper bound for authenticating set-membership queries using RSA accumulators) to $O(1)$, keeping the update time sublinear (i.e., $O(n^\epsilon \log n)$). This answers an open problem posed in [32]. Also, the exemplary schemes are extended to obtain a different trade-off between query and update costs, namely constant update time with $O(n^\epsilon)$ query time (see Table 1). For the bilinear-map accumulator solution, the update time is improved from $O(n)$, as it appears in [34], to $O(n^\epsilon)$, while keeping all the other complexity measures constant;

4. A practical evaluation of the exemplary schemes is provided using state-of-the-art software [1, 2] for primitive operations (namely, modular exponentiations, multiplications, inverse computations and bilinear maps);

5. It is proposed to study lower bounds for authenticated set-membership queries using cryptographic accumulators.

1.2 Related Work

There has been a lot of work on authenticating membership queries using different algorithmic and cryptographic approaches. A summary and qualitative comparison can be found in Table 1 above.

Several authenticated data structures based on cryptographic hashing have been developed for membership queries (e.g., [7, 21, 29, 32, 37]), both in the two-party and three-party authentication models. These data structures achieve $O(\log n)$ proof size, query time, update time and verification time. As shown in [41], these bounds are optimal for hash-based methods. Variations of this approach and extensions to other types of queries have also been investigated (e.g., [9, 18, 23, 42]).

Solutions for authenticated membership queries in various settings using another cryptographic primitive, namely one-way accumulators, were introduced by Benaloh and de Mare [6]. Based on the RSA exponentiation function, this scheme implements a secure one-way function that satisfies quasi-commutativity, a useful property that common hash functions lack. This RSA accumulator is used to securely summarize a set so that set-membership can be verified with $O(1)$ overhead. Refinements of the RSA accumulator are also given in [4], where except for one-wayness, collision resistance is achieved, and also in [17, 39]. Dynamic accumulators (along with protocols for zero-knowledge proofs) were introduced in [11], where, using the trapdoor information (these protocols are secure, assuming an honest prover), the time to update the accumulated value or a witness is independent of the number of accumulated elements.

A first step towards a different direction, where one assumes that the prover cannot be trusted and therefore the trapdoor information (e.g., the group order $\phi(N)$) is kept secret, but where the resulting schemes are applicable only to the three-party model, was made in [20]. In this work, general $O(n^\epsilon)$ bounds are derived for various complexity measures such as query and update time. An authenticated data structure that combines hierarchical hashing with the accumulation-based scheme of [20] is presented in [22], and a similar hybrid authentication scheme appears in [35].

Accumulators using other cryptographic primitives (general groups with bilinear pairings) the security of which is based on other assumptions (hardness of strong Diffie-Hellman problem) are presented in [10, 34]. However, updates in [34] are inefficient when the trapdoor information is not known: individual precomputed witnesses can each be updated in constant time, thus incurring a linear total cost for updating all the witnesses after an update in the set. Also in [10], the space needed is proportional to the number of elements ever accumulated in the set (book-keeping information of considerable size is needed), otherwise important constraints on the range of the accumulated values are required. Efficient dynamic accumulators for non-membership proofs are presented in [26]. Accumulators for batch updates are presented in [44] and accumulator-like expressions to authenticate static sets for provable data possession are presented in [3, 16]. The work in [38] studies efficient algorithms for accumulators with unknown trapdoor information. Finally in [15], logarithmic lower bounds as well as constructions achieving query-update cost trade-offs have been studied in the memory-checking model.

1.3 Organization of Sections

Section 2 introduces some necessary cryptographic and algorithmic ideas needed for the development of the exemplary constructions. The security definition of the exemplary schemes is also given. Section 3 develops the first exemplary solution based on the RSA accumulator and presents the main proof of security. Section 4 presents the second exemplary solution that is based on bilinear maps. Section 5 provides an evaluation and analysis of the exemplary authentication methods showing their practicality. Section 6 concludes with a brief consideration of future work and interesting open problems.

2. Preliminaries

This section describes some algorithmic and cryptographic primitives and other useful concepts that are used in the exemplary approaches.

2.1 Hash Tables

The main functionality of the hash table data structure is to support look-ups of elements that belong to a general set (i.e., not necessarily ordered). Different ways of implementing hash tables have been extensively studied (e.g., [14, 24, 25, 27, 31]). Suppose one wishes to store n elements from a universe $U$ in a data structure with expected constant look-up time. For totally ordered universes and by searching based on comparisons, it is well known that one needs $\Omega(\log n)$ time. Hash tables, however, achieve better efficiency as follows.

Set up a one-dimensional table $T[1 \ldots m]$ where $m=O(n)$;

Pick a function $h: U \rightarrow \{1, \ldots, m\}$, called a hash function, randomly selected from a family of two-universal hash functions (also used in Lemma 1). Thus, for any two elements $e_1, e_2 \in U$, one has $$Pr[h(e_1) = h(e_2)] \leq \frac{1}{m};$$

Store element e in slot $T[h(e)]$ of the table.

The probabilistic property that holds for hash function h implies that for any slot of the table, the expected number of elements mapped to it is $O(1)$. Also, if h can be computed in $O(1)$ time, looking-up an element takes expected constant time.

The above property of hash tables comes at some cost. The expected constant-time look-up holds when the number of elements stored in the hash table does not change, i.e., when the hash table is static. In particular, because of insertions, the number of elements stored in a slot may grow and one then cannot assume that the look-up time is expected to be constant. A different problem arises in the presence of deletions as the number n of elements may become much smaller than the size m of the hash table. Thus, one may no longer assume that the hash table uses O(n) space.

In order to deal with updates, one can periodically update the size of the hash table by a constant factor (e.g., doubling or halving its size). This is an expensive operation since one would have to rehash all of the elements. Therefore, there might be one update (over a course of O(n) updates) that takes O(n) rather than O(1) time. Thus, hash tables for dynamic sets typically have expected O(1) query time and O(1) expected amortized time. Methods that vary the size of the hash table for the sake of maintaining O(1) query time, fall into the general category of dynamic hashing.

The above discussion is summarized in the following theorem.

Theorem 1 (Dynamic hashing [13]) For a set of size n, dynamic hashing can be implemented to use O(n) space and have O(1) expected query time for (non) membership queries and O(1) expected amortized cost for elements insertions or deletions.

Before defining some cryptographic primitives, it is useful to give the definition of a negligible function, where k denotes the security parameter.

Definition 1 (Negligible function) Say that a real-valued function $v(k)$ over natural numbers is negligible if for any positive polynomial p, there exists integer m such that $$\forall n > m, |v(n)| < \frac{1}{p(n)}.$$

One may refer to a negligible function $v(k)$ also by saying that $v(k)$ is $neg(k)$.

2.2 The RSA Accumulator

This section gives an overview of the RSA accumulator, which will be used for the construction of the first exemplary solution.

Prime representatives. For security and correctness reasons that will soon become clear, the first construction extensively uses the notion of prime representatives of elements. Initially introduced in [4], prime representatives provide a solution whenever it is necessary to map general elements to prime numbers. In particular, one can map a k-bit element $e_i$ to a 3k-bit prime $x_i$ using two-universal hash functions [12].

Say that a family of functions $H=\{h: A \to B\}$ is two-universal if, for all $w_1 \neq w_2$ and for a randomly chosen function h from H, one has $$Pr[h(w_1) = h(w_2)] \leq \frac{1}{|B|}.$$

In this context, set A is the set of 3k-bit boolean vectors, B is the set of k-bit boolean vectors, and one uses the two-universal function $$h(x) = Fx,$$

where F is a k×3k boolean matrix. Since the linear system $h(x)=Fx$ has more than one solution, one k-bit element is mapped to more than one 3k-bit elements. This approach is interested in finding only one such solution which is prime; this can be computed efficiently according to the following result:

Lemma 1 (Prime representatives [17, 20]) Let H be a two-universal family of functions mapping $\{0,1\}^{3k}$ to $\{0,1\}^k$ and let h ∈ H. For any element $e_i \in \{0,1\}^k$, one can compute a prime $x_i \in \{0,1\}^{3k}$ such that $h(x_i) = e_i$ by sampling $O(k^2)$ times with high probability from the set of inverses $h^{-1}(e_i)$.

Lemma 1 implies that one can compute prime representatives in expected constant time, since the dimension of the problem is the number n of the elements in the hash table. Also, solving the k×3k linear system in order to compute the set of inverses can be performed in polynomial time in k by using standard methods (e.g., Gaussian elimination). Finally, note that, in the present context, prime representatives are computed and stored only once. Indeed, using the above method multiple times for computing the prime representative of the same element will not yield the same prime as output, for Lemma 1 describes a randomized process. From now on, given a k-bit element x, denote with r(x) the 3k-bit prime representative that is computed as described above.

The RSA accumulator. Now given is an overview of the RSA accumulator [4, 6, 11], which provides an efficient technique to produce a short (computational) proof that a certain element is a member of a set. The RSA accumulator works as follows. Suppose one has the set of k-bit elements $E=\{e_1, e_2, \ldots, e_n\}$. Let N be a k'-bit RSA modulus (k'>3k), namely N=pq, where p, q are strong primes [11]. One can represent E compactly and securely with an accumulation value, which is a k'-bit integer, as follows $$f(E) = g^{r(e_1)r(e_2) \cdots r(e_n)} \mod(N),$$

where $g \in QR_N$ and $r(e_i)$ is a 3k-bit prime representative. Note that the RSA modulus N, the exponentiation base g and the two-universal hash functions comprise the public key pk, i.e., information that is available to the adversary. Subject to the accumulation $f(E)$, every element $e_i$ in set E has a membership witness (or proof), namely the value $$A_{e_i} = g^{\prod e_j \in E; e_j \neq e_i r(e_j)} \mod N.$$

Given the accumulation value $f(E)$ and a witness $A_{e_i}$, membership of $e_i$ in E can be verified by computing $A_{e_i}^{r(e_i)} \mod N$ and checking that this equals $f(E)$.

The above representation also has the property that any computationally bounded adversary A who does not know $\phi(N)$ cannot find another set of elements $E' \neq E$ such that $f(E')=f(E)$, unless A breaks the strong RSA assumption [4], which is stated as follows:

Definition 2 (Strong RSA assumption) Given an RSA modulus N and a random element $x \in Z_N$, it is hard (i.e., it can be done with probability that is neg(k), which is negligible in the security parameter k) for a computationally bounded adversary A to find y>1 and a such that $a^y = x \mod N$.

The security of the exemplary RSA-accumulator solution is based on the following result. Also shown is the proof of that Lemma, originally given in [4].

Lemma 2 (Security of the RSA accumulator [4]) Let k be the security parameter, h be a two-universal hash function that maps 3w-bit integers to w-bit integers and N be a (3w+1)-bit RSA modulus. Given a set of elements E, the probability that a computationally bounded adversary A, knowing only N and g, can find a set $E' \neq E$ with the same accumulation as E (i.e, $f(E')=f(E)$) is neg(k).

Proof: Suppose A finds such a set E'. That means that A finds another set $\{e_1', e_2', \ldots, e_n'\} \neq \{e_1, e_2, \ldots, e_n\}$ such that $$g^{r(e_1)r(e_2) \cdots r(e_n)} = g^{r(e_1')r(e_2') \cdots r(e_n')} \mod N.$$

By the way the prime representatives are constructed, it is not possible that a prime representative can be associated with two different elements. Therefore, it also holds $\{r(e_1), r(e_2), \ldots, r(e_n)\} \neq \{r(e_1'), r(e_2'), \ldots, r(e_n')\}$ which implies that the adversary can find a value A and an index j such that $$A^{r(ej)} = g^{r(e'_1)r(e'_2)\ldots r(e_n')} \bmod N,$$

where $$A = g^{\Pi i \neq j^{r(e_j)}} \bmod N.$$

Let $e = r(e_j)$ and $r = r(e'_1)r(e'_2)\ldots r(e'_n)$. The adversary can now compute the e-th root of g as follows: A computes $a,b \in Z$ such that $ar + br(e_j) = 1$ by using the extended Euclidean algorithm, since $r(e_j)$ is a prime. Let now $y = A^a g^b$. It is $$y^e = A^{ar(ej)} g^{br(ej)} = g^{ar+br(ej)} = g \bmod N$$

and, therefore, A can break the strong RSA assumption which occurs with probability $\nu(k)$, where $\nu(k)$ is neg(k).

Using the same proof arguments, the following corollary holds.

Corollary 1 Let k be the security parameter, h be a two-universal hash function mapping 3w-bit integers to w-bit integers and N be a (3w+1)-bit RSA modulus. Given a set of elements E and h, the probability that a computationally bounded adversary A, knowing only N and g, can find A and $x \notin E$ such that $A^{r(x)} = f(E)$ is neg(k).

2.3 The Bilinear-Map Accumulator

This section gives an overview of the bilinear-map accumulator which will be used for the construction of the second exemplary solution.

Bilinear pairings. Before presenting the bilinear-map accumulator, some basic terminology and definitions about bilinear pairings are described. Let $G_1$, $G_2$ be two cyclic multiplicative groups of prime order p, generated by $g_1$ and $g_2$ and for which there exists an isomorphism $\psi: G_2 \to G_1$ such that $\psi(g_2) = g_1$. Here, $G_M$ is a cyclic multiplicative group with the same order p and $e: G_1 \times G_2 \to G_M$ is a bilinear pairing with the following properties:

1. Bilinearity: $e(P^a, Q^b) = e(P, Q)^{ab}$ for all $P \in G_1$, $Q \in G_2$ and $a, b \in Z_p$;
2. Non-degeneracy: $e(g_1, g_2) \neq 1$;
3. Computability: There is an efficient algorithm to compute $e(P, Q)$ for all $P \in G_1$ and $Q \in G_2$.

In this setting one has $G_1 = G_2 = G$ and $g_1 = g_2 = g$. A bilinear pairing instance generator is a probabilistic polynomial time algorithm that takes as input the security parameter $1^k$ and outputs a uniformly random tuple $t = (p, G, G_M, e, g)$ of bilinear pairings parameters. Later one may see that the security of the bilinear-map accumulator is based on an assumption that is related to the bilinear pairings.

The bilinear-map accumulator. Similarly with the RSA accumulator, the bilinear-map accumulator [34] is an efficient way to provide short proofs of membership for elements that belong to a set. The bilinear-map accumulator works as follows. It accumulates elements in $Z_p^*$ (where p is a prime) and the accumulated value is an element in G. Given a set of n elements $E = \{e_1, e_2, \ldots, e_n\}$ the accumulation value $f'(E)$ is defined as $$f'(E) = g^{(e_1+s)(e_2+s)\ldots(e_n+s)},$$

where g is a generator of group G of prime order p and $s \in Z_p^*$ is a randomly chosen value that constitutes the trapdoor in the scheme (in the same way that $\phi(N)$ was the trapdoor in the RSA accumulator). The proof of membership for an element $e_i$ that belongs to set E will be the witness $$A_{e_i} = g^{\Pi ej \in E; ej = ei(ej+s)}.$$

Accordingly, a verifier can test set membership for $e_i$ by computing $A_{e_i}^{(e_i+s)}$ and checking that this equals $f'(E)$.

Here one must make an important observation: The group G is generic. That means that its elements are not simple integers and doing operations between two elements of G can be complicated. The implementation of G will be referred to in a later section. Also, the operations in the exponent of elements of G are performed modulo p, since this is the order of the group G. The security of the bilinear pairings accumulator is based on the q-strong Diffie-Hellman assumption which can be stated as follows:

Definition 3 (Q-Strong Diffie-Hellman Assumption)

Given a uniformly randomly generated tuple $t = (p, G, G_M, e, g)$ of bilinear pairings parameters and the elements of $G_M$ g, $g^s, g^{s^2}, \ldots g^{s^q}$ for some s chosen at random from $Z_p^*$, it is hard (i.e., it can be done with probability that is neg(k), which is negligible in the security parameter k) for a computationally bounded adversary A to find $c \in Z_p$ and output (c, $g^{1/(s+c)}$).

Recall the main security claim for the bilinear pairings accumulator, i.e., that it provides collision resistance:

Lemma 3 (Security of the bilinear-map accumulator [34]) Let k be the security parameter and $t = (p, G, G_M, e, g)$ be a uniformly randomly generated tuple of bilinear pairings parameters. Given a set of elements E, the probability that a computationally bounded adversary A, knowing only g, $g^s$, $g^{s^2}, \ldots g^{s^q}$ ($q \geq |E|$) for some s chosen at random from $Z_p^*$ and t, can find a set $E' \neq E$ ($q \geq |E'|$) such that $f'(E') = f'(E)$ is neg(k).

Proof: Suppose A finds such a set E'. That means that A finds another set $\{e'_1, e'_2, \ldots, e'_{n'}\} \neq \{e_1, e_2, \ldots, e_n\}$ such that $$g^{(e_1+s)(e_2+s)\ldots(e_n+s)} = g^{(e'_1+s)(e'_2+s)\ldots(e'_{n'}+s)}$$

which implies that $$A^{(e''_j+s)} = g^{(e_1+s)(e_2+s)\ldots(e_n+s)},$$

where $$A = g^{\Pi i \neq j^{(e_i'+s)}}$$

for some $e'_j$ that does not belong to the original set. Note now that the quantity $$\Pi_n = (e_1+s)(e_2+s)\ldots(e_n+s)$$

can be viewed as a polynomial in s of degree n. Since $e'_j \notin E$, one has that $(e'_j+s)$ does not divide $\nabla_n$ and therefore A can find c and P such that $\Pi_n = c + P(e'_j + s)$. Therefore $$A = g^P g^{c/(e'_j+s)}$$

which gives $g^{1/(x+s)} = [A[g^P]^{-1}]^{c^{-1}}$ and the adversary can break the q-strong Diffie-Hellmann assumption which occurs with probability that is neg(k).

Here note that the public key pk in the case of the bilinear-map accumulator is comprised by the exponentiation base g and the elements g, $g^s, g^{s^2}, \ldots, g^{s^q}$ (see Lemma 3). As before, one can now state the following corollary:

Corollary 2 Let k be the security parameter and $t = (p, G, G_M, e, g)$ be a uniformly randomly generated tuple of bilinear pairings parameters. Given a set of elements E, the probability that a computationally bounded adversary A, knowing only g, $g^s, g^{s^2}, \ldots, g^{s^q}$ ($q \geq |E|$) for some s chosen at random from $Z_p^*$, and t, can find A and $x \notin E$ such that $A^{x+s} = f'(E)$ is neg(k).

2.4 Set-Membership Authentication Schemes

This section continues with the definition of set-membership authentication schemes and their main security property, which captures the security requirements of authenticated hash tables. Suppose S is a set for which one wishes to authenticate membership of elements (i.e., queries of type "does x belong to S ?") and let pk be the public key. A set-membership authentication scheme consists of three algorithms update, query, verify, and associated data structures, for respectively updating S, querying S to produce a corresponding set-membership proof, and verifying an answer to a query. In general, these algorithms are:

1. $\{S', d'\} \leftarrow \text{update}(upd,S)$, where d' is the new digest of S after the update (recall that the digest of S is a short description of S, e.g., the root hash of a Merkle tree), upd is an update supported by the data structure and S, S' are the old and new (updated) sets respectively;
2. $\Pi(x) \leftarrow \text{query}(x,S)$, where $\Pi(x)$ is the proof returned to a query for membership of element x in S;
3. $\{\text{accept, reject}\} \leftarrow \text{verify}(x, \Pi(x), d)$, where d is the current digest of S and $\Pi(x)$ is the proof, both used for verifying membership of x in S.

It is required that a set-membership authentication scheme (update, query, verify) is correct, i.e., for any $x \in S$ it holds that accept$\leftarrow$verify (x, query(x,S),d).

With respect to the security of the scheme, assume that the adversary is given oracle access to all these algorithms for updating and querying S and also for verifying answers. The formal security definition, which is an adaptation to the setting of the security definition for dynamic accumulators presented in [11], for a membership authentication scheme of a set S is as follows:

Definition 4 (Security) Suppose k is the security parameter and A is a computationally bounded adversary that is given the public key pk. Set S is initially empty and $S=S_0$. First, in the update stage, the adversary A chooses and issues a series of t+1 updates $$upd_i \in \{ins(x_i), del(x_i)\} \text{ for } i=0, \ldots, t,$$

which yields a series of sets derived from S and corresponding digests $$\{S_{i+1}, d_{i+1}\} \leftarrow \text{update}(upd_i, S_i),$$

where $d_0$ is the digest of an empty set and t is polynomially dependent on the security parameter k. After the update stage, A possesses the new set $S_{t+1}$ and the corresponding digest $d_{t+1}$. Next, adversary A enters the attack stage where he chooses an element $y \notin S_{t+1}$, and computes a proof $\Pi(y)$ for y. Say that the set-membership authentication scheme (update, query, verify) is secure if the probability that accept$\leftarrow$verify $(y, \in(y), d_{t+1})$ is neg(k).

Remarks on Definition 4. The following observations are made about the security requirements given in Definition 4.

1. The security definition captures the setting where an adversary tries to forge proofs for elements that do not belong to the existing set, which is the main attack one seeks to guard against. Additionally, as in [11], the adversary is allowed to choose his own updates and choose his own elements to forge, which provides a stronger notion of security, as the authentication scheme defeats attacks independently of the history of updates in the set;
2. This security definition is applicable to both concrete authentication models of interest (two-party and three-party) in the sense that in both models security is defined subject to the correct digest defined over the current set. That is, set-membership authentication is guaranteed assuming that the verification algorithm takes as input this (correct and fresh) digest. As will be seen, this assumption will be achieved with different methods: In the three-party model a time-stamped signature on the digest (produced by the source) is used by the client to verify the validity of the digest, whereas in the two-party model the client engages in a protocol with the server that allows him to locally update the digest correctly with non-negligible probability;
3. Modeling the information given to the adversary through oracle access is not restrictive; in the concrete schemes and at all times, the information that the server stores and maintains is completely characterized by invocation of algorithms update, query, verify (or equivalently by polynomial-time functions on the current set and the public key pk). Finally, note that in essence the above security definition captures the case where the adversary performs an attack in some older state $S_{t'}$, t'<t, of the data set than the current one $S_t$, that is, when the attack phase includes some set updates. This is the case exactly because all the new information that the adversary gets between t' and t is a polynomial-time function of pk.

2.5 Two-Party and Three-Party Models

FIG. 1 shows a schematic illustration of an exemplary two-party authenticated data storage model 10 within which exemplary embodiments of the invention may be utilized. Owned by a client C 12 but hosted at a remote untrusted server S 14, a file system FS 16 evolves over time through a series of update and query operations, issued by C 12 and executed by S 14. At all times, C 12 stores a succinct state 20 (e.g., a digest of few bytes) of FS 16. Authentication of operations is performed through verification or consistency proofs that are provided to C 12 (along with any answers to the operations provided by FS 16) by an authentication service module 18 that runs in memory independently of FS 16 and is controlled by S 14. A proof is used by C 12 to verify the current operation and consistently update the state (digest). That is, the authentication service module 18 stores additional authentication information 22 about FS 16. The file system may be generated and queried through the series of update and query operations.

Consider the following as a non-limiting example of the potential operations involved. The client C 12 sends a query x 24 on the FS 16 to the untrusted server S 14. The server S 14 performs the query operation and obtains an answer a 26. The authentication service 18 generates a proof y 28. The answer a 26 and the proof y 28 are sent to the client C 12. Although shown in FIG. 1 as being sent to separately, in other exemplary embodiments the answer a 26 and the proof y 28 are sent together (e.g., in a single message or transmission) from the server S 14 to the client C 12. Similarly, although shown in FIG. 1 as being received by two separate components, the query x 24 may be received once by the server S 14, with the server S 14 internally sending the query x 24 to both be processed (i.e., to obtain the answer a 26) and to generate the proof y 28. The specific functionality of the query x 24, the answer a 26 and the proof y 28 are explained in further detail in [46]. Similarly, further reference with regard to FIG. 1 may be made to [46].

The three-party model is very similar in nature to the two-party model except a third party, a source, provides the data to be stored by the (untrusted) server. Thus, instead of having the client perform updates on the stored data, the updates are received from the source. The actions performed by the server are generally the same (e.g., answering queries, returning proofs, performing updates).

3. Scheme Based on the RSA Accumulator

This section describes how one can use the RSA accumulator in order to implement authenticated hash tables, that is, set-membership authentication schemes that authenticate the functionality of hash tables.

The exemplary solution is applicable to two concrete data authentication models, the two-party model and the three-party model that were briefly described in Section 1. Recall that the two-party model refers to the data outsourcing scenario, where a client relocates all of its data to an untrusted server, the client being the party that issues both queries and updates to the outsourced data. Further recall that the three-party model refers to a slightly different scenario, where a trusted source makes its data available to an untrusted server that answers queries submitted by a client, the source being the party that issues updates and the client being the party that issues queries. In both settings, the goal is to design secure and efficient protocols for verifying that the untrusted server correctly manages the outsourced data.

Section 3.1 describes accumulation trees, the main data structure behind the exemplary solution, which is also used in Section 4. Section 3.2 describes the setup that is needed for the exemplary solution in both models. Section 3.3 describes the main authenticated data structure used in the exemplary authentication schemes. Focusing on the three-party model, Section 3.4 shows how the construction applies to the special case of static data, providing some intuition for the general dynamic solution (authenticated hash tables) that follows in Section 3.5. Section 3.6 applies the results to the two-party model and Section 3.7 shows how to achieve a more practical scheme by using random oracles.

3.1 The Accumulation Tree

This section describes the main construction for authenticating set-membership in a hash table. Initially, a general scheme is presented which can be extended in order to achieve better complexity bounds for the hash table.

Let $S=\{e_1, e_2, \ldots, e_n\}$ be the set of elements one would like to authenticate. Given a constant $\epsilon<1$ such that $0<\epsilon<1$, the accumulation tree of S, denoted $T(\epsilon)$, is a rooted tree with n leaves defined as follows:

1. The leaves of T(e) store the elements $e_1, e_2, \ldots, e_n$;
2. $T(\epsilon)$ consists of exactly $$l = \left\lceil \frac{1}{\epsilon} \right\rceil$$

levels;
3. All the leaves are at the same level;
4. Every node of $T(\epsilon)$ has $O(n^\epsilon)$ children;
5. Level i in the tree contains $O(n^{1-i\epsilon})$ nodes, where the leaves are at level 0 and the root is at level 1.

Figure 2:
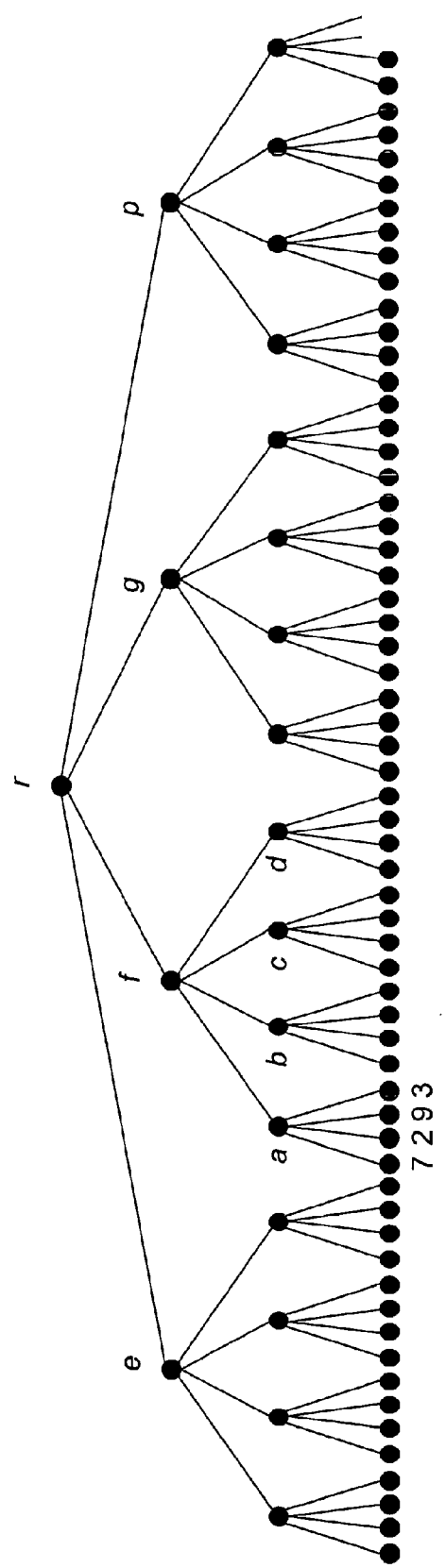
FIG. 2 shows an exemplary accumulation tree of a set of 64 elements for $$\varepsilon = \frac{1}{3};$$
Figure 4:
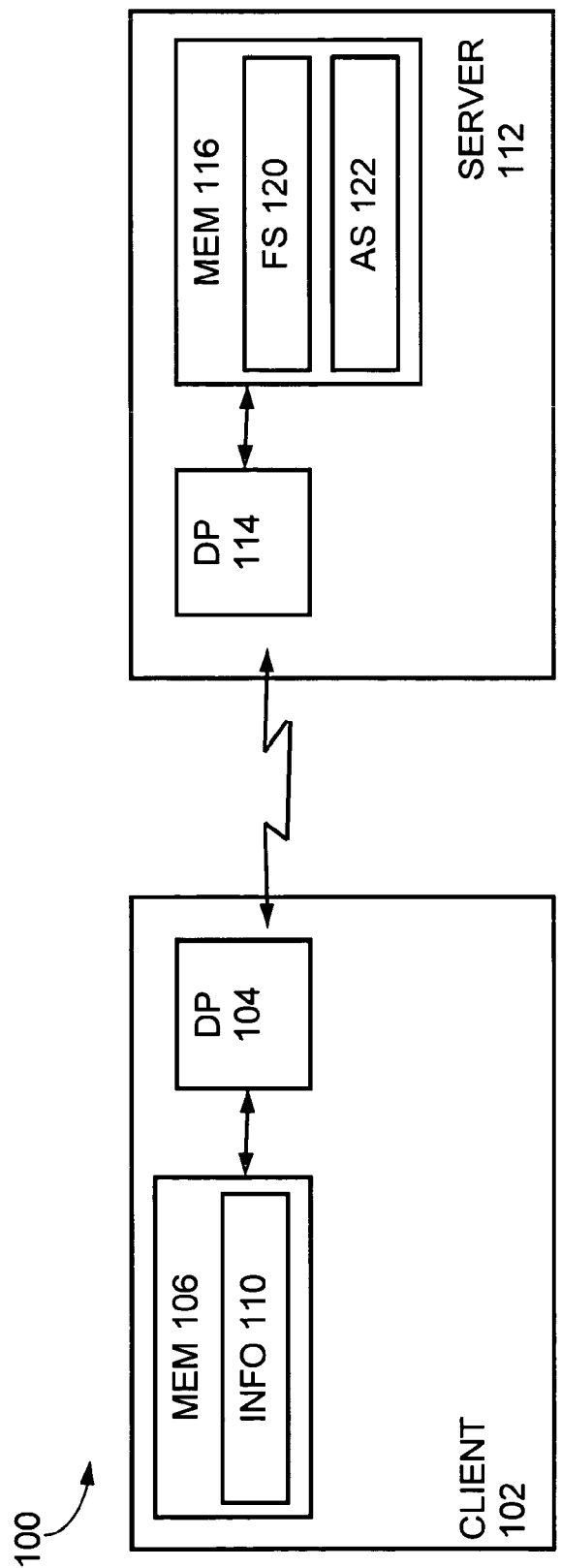
FIG. 4 illustrates a simplified block diagram of an electronic device that is suitable for use in practicing the exemplary embodiments of this invention.

FIG. 2 shows an exemplary accumulation tree of a set of 64 elements for $$\epsilon = \frac{1}{3}.$$

Every internal node has $$4 = 64^{\frac{1}{\epsilon}}$$

children, there are $$3 = \frac{1}{\epsilon}$$

levels in total, and there are $64^{1-i/3}$ nodes at level i=0, 1, 2, 3.

Note that the levels of the accumulation tree are numbered from the leaves to the root of the tree, i.e., the leaves have level 0, their parents level 1 and finally the root has level 1. The structure of the accumulation tree, which for a set of 64 elements is shown in FIG. 1, resembles that of normal "flat" search trees, in particular, the structure of a B-tree. However there are some differences: First, every internal node of the accumulation tree, instead of having a constant upper bound on its degree, has a bound that is a function of the number of its leaves n; also, its depth is always maintained to be constant, namely $$O\left(\frac{1}{\epsilon}\right).$$

Note that it is simple to construct the accumulation tree when $n^\epsilon$ is an integer (see FIG. 1). Else, one may define the accumulation tree to be the unique tree of degree $\lceil n^\epsilon \rceil$ (by assuming a certain ordering of the leaves). This maintains the degree of internal nodes to be $O(n^\epsilon)$.

Using the accumulation tree and search keys stored at the internal nodes, one can search for an element in $O(n^\epsilon)$ time and perform updates in $O(n^\epsilon)$ amortized time. Indeed, as the depth of the tree is not allowed to vary, one should periodically (e.g., when the number of elements of the tree doubles) rebuild the tree spending O(n) time. By using individual binary trees to index the search keys within each internal node, queries could be answered in O(log n) time and updates could be processed in O(log n) amortized time. Yet, the reason for building this flat tree is not to use it as a search structure, but rather to design an authentication structure for defining the digest of S that matches the optimal querying performance of hash tables. The idea is as follows: one wishes to hierarchically employ the RSA accumulator over the subsets (of accumulation values) defined by each internal node in the accumulation tree, so that membership proofs of size proportional to the depth of the tree (hence of constant size) are defined with respect to the root digest (the accumulation value of the entire set).

3.2 System Setup

Towards employing the RSA accumulator hierarchically over the accumulation tree, this section describes the initial setup of the exemplary authentication schemes.

Let k be the security parameter. In the two-party model, the client initially picks constant $0<\epsilon<1$ and $l=\lceil 1/\epsilon \rceil$ RSA moduli $N_i=p_iq_i$ (i=1, ..., l), where $p_i$, $q_i$ are strong primes [11]. The length of the RSA moduli is defined by the recursive relation $$|N_{i+1}|=3|N_i|+1,$$

where $|N_1|=3k+1$ and i=1, ..., l-1. Note that since l is constant all the RSA moduli have asymptotically the same dependence on the security parameter k. For i=1, ..., l, the client reveals $N_i$ to the untrusted server but keeps $\phi(N_i)=(p_i-1)(q_i-1)$ secret. The client also picks/public bases $g_i \in QR_{N_i}$ to be used for exponentiation. Finally, given l families of two-universal hash functions $H_1, H_2, \ldots, H_l$, the client randomly picks one function $h_i \in H_i$ and reveals $h_i$ to the server (to be used for computing multiple prime representatives). The function $h_i$ is such that it maps $(|N_i|-1)$-bit primes to $((|N_i|-1)-1)/3)$-bit integers. Also, the choice of the domains and ranges of functions $h_i$ and of the lengths of moduli $N_i$ is due to the requirement that prime representatives should be smaller numbers than the respective moduli (see [39]). As will be seen in Section 5, using ideas from [4] it is possible to avoid the increasing size of the RSA moduli and instead use only one size for all $N_i$'s. By doing so, however, one is forced to prove security in the random oracle model (using cryptographic hash functions), which is fine for practical applications. It is crucial that $\phi(N_i)$ is not revealed to the untrusted server, since otherwise the security of the whole system collapses, as the server would be able to compute inverses and, as it will become clear, forge proofs. Note that since $1/\in$ is constant, the client needs constant space.

In the three-party model, the setup is exactly as above, except all the public information (RSA moduli, two-universal hash functions) and the secret information (factorization $\phi$) is generated by the source; also, the client now only gets the public information.

3.3 Main Authenticated Data Structure

This section presents the main component of the exemplary authentication schemes, an authenticated data structure that is based on the accumulation tree. This structure is stored at all times at the server; in the three-party model the structure is also stored by the source. Let S be the set one would like to authenticate. The authenticated data structure is defined with respect to the accumulation tree as follows. By hierarchically employing the RSA accumulator over set S, the accumulation tree is augmented with a collection of corresponding accumulation values. That is, assuming the setup parameters are in place, for any node v in the accumulation tree, one defines its accumulation value $\chi(v)$ recursively along the tree structure, as a function of the accumulation value of its children (in a similar way as in a Merkle tree). In particular, let $h_1, h_2, \ldots, h_l$, $$l = \left\lceil \frac{1}{\varepsilon} \right\rceil,$$

be two-universal hash functions, where $h_i$ maps $w_i$-bit elements to $3w_i$-bit primes, $i=1, \ldots l$. For every leaf node v in tree $T(\in)$ that lies at level 0 and stores element e, set $\chi(v)=e$, while for every non-leaf node v in $T(\in)$ that lies in level $1 \leq i \leq l$, set:

$$\chi(v) = g_i^{\prod_{u \in N(v)} r_i(\chi(u))} \bmod N_i, \quad (1)$$

where $r_i(\chi(u))$ is a prime representative of $\chi(u)$ computed using function $h_i$, $N(v)$ is the set of children of node v and $g_i \in QR_{N_i}$. Additionally, store at each node v at level i of the accumulation tree the prime representative $r_{i+1}(\chi(v))$ of its accumulation value $\chi(v)$ (except for the root of the tree that lies at level 1 where one does not need a prime representative since its $\chi()$ value is the digest of the set).

The above authenticated data structure may be called an augmented accumulation tree built on top of S, but often, for simplicity and when it is clear from the context, it may be referred to as the accumulation tree $T(\in)$. Given these accumulation values, the augmented accumulation tree can be seen as a systematic way to define a digest over an underlying set.

Definition 5 Given a set $S = \{e_1, e_2, \ldots, e_n\}$ of n elements, l RSA moduli $N_1, N_2, \ldots, N_l$, l two-universal functions $h_1, h_2, \ldots h_l$ and the accumulation tree $T(\in)$ built on top of S, define the RSA digest of node v of the accumulation tree to be equal to $\chi(v)$, also denoted with $\chi(S_v)$, where $S_v \subseteq S$ is the set of elements associated with the subtree rooted at v. The RSA digest of the set S is equal to $\chi(r)$, where r is the root of tree $T(\in)$.

Note that, given a set S, the RSA digest $\chi(S)$ depends on the elements in S, the used RSA moduli and two-universal functions, but not on the structure of the tree, because the structure of $T(\in)$, for a given $\in$, is deterministic and the RSA exponentiation function is quasi-commutative. Next shown is the main security property of the new authenticated data structure.

Theorem 2 (Collision resistance) Let k be the security parameter and $U = \{u_1, u_2, \ldots, u_n\}$ a set of n elements. Given the associated accumulation tree $T(\in)$ built on top of U, under the strong RSA assumption, the probability that a computationally bounded adversary A, knowing only the RSA moduli $N_i$ and $g_i$, $1 \leq i \leq l$ ($l = \lceil 1/\in \rceil$), can find another set $V \neq U$ such that $\chi(V) = \chi(U)$ is neg(k).

Proof: The following claim will be proven by induction: Given an accumulation tree of l levels, it is difficult for a computationally bounded adversary to find two different sets U,V such that $\chi_l(U) = \chi_l(V)$, where $\chi_l(S)$ is the RSA digest that is computed using an l-level accumulation tree on set S. For the base case l=1 the claim trivially holds by Lemma 2; in particular, one has that for any sets $U \neq V$ it holds:

$$Pr[\chi_1(U) = \chi_1(V) \wedge U \neq V] \leq v(k),$$

where $v(k)$ is the appropriate negligible function from Lemma 2. Suppose the claim holds for l=i, i.e., for any sets $U \neq V$ for the inductive case one has $$Pr[\chi_i(U) = \chi_i(V) \wedge U \neq V] \leq v(k).$$

Let now $$\chi_{i+1}(U) = g_{i+1}^{r_{i+1}(\chi_i(U_1)) r_{i+1}(\chi_i(U_2)) \cdots r_{i+1}(\chi_i(U_t))} \bmod N_{i+1}$$

for $U_1, U_2, \ldots, U_t \subseteq U$ and $$\chi_{i+1}(V) = g_{i+1}^{r_{i+1}(\chi_i(V_1)) r_{i+1}(\chi_i(V_2)) \cdots r_{i+1}(\chi_i(V_{t'}))} \bmod N_{i+1}$$

for $V_1, V_2, \ldots, V_{t'} \subseteq V$. Consider now the set of prime numbers $$P(U) = \{r_{i+1}(\chi_i(U_1)), r_{i+1}(\chi_i(U_2)), \ldots, r_{i+1}(\chi_i(U_t))\}$$

and $$P(V) = \{r_{i+1}(\chi_i(V_1)), r_{i+1}(\chi_i(V_2)), \ldots, r_{i+1}(\chi_i(V_{t'}))\}.$$

One wants to compute the probability $Pr[\chi_{i+1}(U) = \chi_{i+1}(V) \wedge U \neq V]$. The event $\chi_{i+1}(U) = \chi_{i+1}(V) \wedge U \neq V$ can be written as $$[\chi_{i+1}(U) = \chi_{i+1}(V) \wedge P(U) = P(V) \wedge U \neq V] \vee [\chi_{i+1}(U) = \chi_{i+1}(V) \wedge P(U) \neq P(V) \wedge U \neq V]$$

and therefore by the union bound and by the fact that $Pr(A \cap B) \leq Pr(A)$ one can derive the following inequalities:

$$Pr[\chi_{i+1}(U) = \chi_{i+1}(V) \wedge U \neq V] \leq$$
$$Pr[\chi_{i+1}(U) = \chi_{i+1}(V) \wedge P(U) = P(V) \wedge U \neq V] +$$
$$Pr[\chi_{i+1}(U) = \chi_{i+1}(V) \wedge P(U) \neq P(V) \wedge U \neq V] \leq$$
$$Pr[\chi_{i+1}(U) = \chi_{i+1}(V) \wedge P(U) = P(V) \wedge U \neq V] +$$
$$Pr[\chi_{i+1}(U) = \chi_{i+1}(V) \wedge P(U) \neq P(V)] \leq$$
$$Pr[\chi_{i+1}(U) = \chi_{i+1}(V) \wedge P(U) = P(V) \wedge U \neq V] + v(k) \leq$$
$$Pr[P(U) = P(V) \wedge U \neq V] + v(k).$$

Note that $Pr[\chi_{i+1}(U) = \chi_{i+1}(V) \wedge P(U) \neq P(V)] \leq v(k)$ trivially holds from Lemma 2. Beginning now from the event $P(U) = P(V) \wedge U \neq V$ and for some permutation f of the elements in set $P(V)$, one can derive the following implications:

$$P(U) = P(V) \wedge U \neq V \Rightarrow \bigwedge_{j=1}^{t} \chi_i(U_j) = \quad (2)$$
$$\chi_i(V_{f(j)}) \wedge U \neq V \Rightarrow \chi_i(U_a) = \chi_i(V_{f(a)}) \wedge U_a \neq V_{f(a)}.$$

This is because for two prime representatives $r_1(x_1), r_2(x_2)$ of $x_1, x_2$ one has that $r_1(x_1) = r_2(x_2) \Rightarrow x_1 = x_2$ and because there has to be some a such that $U_a \neq V_{f(a)}$ since for all i it is $U_i \supset U$ and $V_i \subset V$ and also $U \neq V$. Since for all events A,B such that $A \Rightarrow B$ it is $Pr(A) \leq Pr(B)$, one has that $$Pr[P(U)=P(V) \wedge U \neq V]+v(k) \leq Pr[\chi_i(U_a)=\chi_i(V_{f(a)}) \wedge U_a \neq V_{f(a)}]+v(k),$$

for some index a. By the inductive step one has $Pr[\chi_i(U_a)=\chi_i(V_{f(a)}) \wedge U_a \neq V_{f(a)}] \leq v(k)$ and therefore $$Pr[\chi_{i+1}(U)=\chi_{i+1}(V) \wedge U \neq V] \leq 2v(k),$$

which completes the proof.

3.4 Authenticating Static Sets

This section describes how to use the accumulation-tree based structure to optimally verify membership in a static set in constant time. The following methods will also form the basis for the exemplary main authentication schemes for the three-party model in Section 3.5.

Let $S=\{e_1, e_2, \ldots, e_n\}$ be the static set that is outsourced to an untrusted server. As was seen in Section 3.2, the RSA moduli $N_i$ and bases $g_i$, $1 \leq i \leq l$ are public. The server stores set S and builds the (augmented) accumulation tree $T(\in)$ on top of S. Recall that for every node v of $T(\in)$ that lies at level i ($0 \leq i \leq l-1$), the server stores the prime representative $r_{i+1}(\chi(S_v))$ along with the RSA digest $\chi(S_v)$. Having access only to the set digest $d=\chi(S)$, the client should be able to verify membership in S as next described.

Queries. It is shown how the server constructs a proof that is used to validate an element $X \in S$. Let $v_0, v_1, \ldots, v_l$ be the path from x to the root of $T(\in)$, $r=v_l$. Let $B(v)$ denote the set of siblings of node v in $T(\in)$. The proof $\Pi(x)$ is the ordered sequence $\pi_1, \pi_2, \ldots, \pi_l$, where $\pi_i$ is a tuple of a prime representative and a "branch" witness, i.e., a witness that authenticates every node of the path from the queried node to the root of the tree, $v_l$. Thus, item $\pi_i$ of proof $\Pi(x)$ (i=1, ..., l) is defined as:

$$\pi_i = (r_i(\chi(v_{i-1})), g_i^{\prod_{u \in B(v_{i-1})} r_i(\chi(u))} \mod N_i. \quad (3)$$

For simplicity, set $\alpha_i = r_i(\chi(v_{i-1}))$ and $$\beta_i = g_i^{\prod_{u \in B(v_{i-1})} r_i(\chi(u))} \mod N_i. \quad (4)$$

For example in FIG. 1, the proof for element 2 consists of 3 tuples:

$$\pi_1 = (r_1(2), g_1^{r_1(7)r_1(9)r_1(3)} \mod N_1),$$

$$\pi_2 = (r_2(\chi(a)), g_2^{r_2(\chi(b))r_2(\chi(c))r_2(\chi(d))} \mod N_2),$$

$$\pi_3 = (r_3(\chi(f)), g_3^{r_3(\chi(e))r_3(\chi(g))r_3(\chi(p))} \mod N_3).$$

Using the prime representatives, the above proofs can be computed from scratch in $$O\left(\frac{1}{\varepsilon} n^\varepsilon\right)$$

time every time there is a new query. However, as this is considering the static case, the server does not have to compute witnesses again and again; it is more time-efficient to use precomputed witnesses, i.e., to have the server compute the witnesses once and store them for future use.

Verification. Given the proof $\Pi(x) = \pi_1, \pi_2, \ldots, \pi_l$ for an element x, the client verifies the membership of x in S as follows. First the client checks if $h_1(\alpha_1) = x$, i.e., that $\alpha_1$ is the prime representative used for the queried element x; then, for i=2, ..., l, the client also checks that the following relations hold $$h_i(\alpha_i) = \beta_{i-1}^{\alpha_{i-1}} \mod N_{i-1}, \quad (5)$$

thus verifying that the proof contains correct prime representatives that are correctly accumulated (along the path corresponding to x) in the accumulation tree. Finally, the client verifies the RSA digest (i.e., the RSA accumulation value of the root of the tree) against the locally stored digest, namely that the following relation holds:

$$d = \beta_l^{\alpha_l} \mod N_l. \quad (6)$$

The client accepts only if all the relations above hold. As will be proven later, the server can forge a proof for an element $y \notin S$ with negligible probability in the security parameter k.

Security. The public key pk in the scheme (see Definition 4) consists of $$l = \left\lceil \frac{1}{\varepsilon} \right\rceil,$$

the RSA moduli $N_1, N_2, \ldots, N_l$ (not $\phi(N_i)$), the exponentiation bases $g_1, g_2, \ldots, g_l$ and the two-universal functions $h_1, h_2, \ldots, h_l$. Also the adversary is given oracle access to all the algorithms that update and query the accumulation tree and also verify queries. The digest d that appears in Definition 4 is the root digest of the accumulation tree. Also, for an element x, $\Pi(x)$ is the set of branch witnesses as defined in Equation 3. The following theorem describes the security of the new construction. The security of the exemplary scheme is based on the strong RSA assumption.

Theorem 3 The exemplary set-membership authentication scheme that combines the accumulation tree and the RSA accumulator is secure according to Definition 4 under the strong RSA assumption.

Proof: Let A be a computationally bounded adversary. Let S be the original set of elements that has been accumulated with the accumulation tree. Define the events:

1. $E_1$="A finds $y \notin S$ and $\alpha_1$ such that $h_1(a_1) = y$";
2. $E_i$="A finds $\alpha_{i-1}, \alpha_i$ and $\beta_{i-1}$ such that $h_i(\alpha_i) = \beta_{i-1}^{\alpha_{i-1}} \mod N_{i-1}$" for i=2, ..., l;
3. $E_{i+1}$="A finds $\alpha_l$ and $\beta_l$ such that $\beta_l^{\alpha_l} = \chi(S) \mod N_l$".

One wants to bound the probability $Pr[E_1 \cap E_2 \cap \ldots \cap E_{l+1}]$ and induction is being used. For l=1, consider the event $E_1 \cap E_2$="A finds $y \notin S$ and $\alpha_1, \beta_1$ such that $h_1(a_1) = y$ and $\beta_1^{\alpha_1} = \chi(S) \mod N_1$". By Corollary 1, it is $Pr[E_1 \cap E_2] \leq v(k)$, where $v(k)$ is the appropriate negligible function. For l=i, suppose now $Pr[E_1 \cap E_2 \cap \ldots \cap E_i] \leq v(k)$. For l=i+1 write the event $E_{i+1} = E_{i+1}^{(1)} \cup E_{i+1}^{(0)}$ depending on whether $h_i(\alpha_i)$ is the RSA digest of some subset of S or not. Therefore one has $$Pr[E_1 \cap E_2 \cap \ldots \cap E_{i+1}] \leq Pr[E_1 \cap E_2 \cap \ldots \cap E_{i+1}^{(1)}] + Pr[E_1 \cap E_2 \cap \ldots \cap E_{i+1}^{(0)}] \leq Pr[E_1 \cap E_2 \cap \ldots \cap E_{i+1}^{(1)}] + Pr[E_{i+1}^{(0)}].$$

Consider now the set of RSA digests at level l, i.e., the level of the children of the root of the accumulation tree: It is $\chi(S) = g_i^{a_1 a_2 \cdots a_k} \mod N_i$, where $h_i(a_i)$ is the RSA digest of some subset of S. This observation combined with Corollary 1 and the definition of the event $E_{i+1}^{(0)}$ gives $Pr[E_{i+1}^{(0)}] \leq v(k)$. Therefore $Pr[E_1 \cap E_2 \cap \ldots \cap E_{i+1}] \leq Pr[E_1 \cap E_2 \cap \ldots \cap E_{i+1}^{(1)}] + v(k)$. Note now that the event $E_1 \cap E_2 \cap \ldots \cap E_{i+1}^{(1)}$ implies the event $E_1 \cap E_2 \cap \ldots \cap E_i$ since $h_i(a_i)$ is an RSA digest of some subset of S (i.e., S') and if $y \notin S$ then $y \notin S'$ for all subsets S' of S. Therefore $$Pr[E_1 \cap E_2 \cap \ldots \cap E_{i+1}] \leq Pr[E_1 \cap E_2 \cap \ldots \cap E_{i+1}^{(1)}] + v(k) \leq Pr[E_1 \cap E_2 \cap \ldots \cap E_i] + v(k) \leq 2v(k),$$

which is neg(k).

Complexity. The main result of this section follows.

Theorem 4 Let $0<\epsilon<1$ be a fixed constant. Under the strong RSA assumption, one can use the accumulation tree and the RSA accumulator with precomputed witnesses to authenticate a static set S of n elements in the three party model by storing a data structure of size O(n) at both the source and the server such that:
1. The scheme is secure according to Definition 4;
2. The expected query time is O(1);
3. The size of the proof is O(1);
4. The verification time is O(1);
5. The client keeps space O(1).

Proof: The security of the exemplary scheme is derived by Theorem 3. In the static case, one does not have to compute the witnesses each time one queries for an element. Namely, one can store all the witnesses in the corresponding nodes of the tree. Therefore the server takes O(1) time in expectation (by using a hash table structure) to pick the correct witness for each level and there are $=O(1/\epsilon)=O(1)$ levels in total, which gives O(1) expected query time. The proof for an element is given by the l pairs in Equation 3.

Since $l=O(1)$ and both the prime representatives and the branch witnesses are quantities that are reduced modulo some $N_i$ (which is independent of n), the size of the proof is O(1). Using now Equations 5 and 6, which are O(1) total, one can verify in O(1) time, since an exponentiation is considered to be a constant time operation. In order to do the verification, the client needs to keep the root RSA digest which has constant size. Finally the update authentication information consists of a signature of the root RSA digest, which has constant size.

Note that this result applies also in the two-party model. Also, it is noted that the same complexity result for a static set can also be achieved without using an accumulation tree and by using a straight-forward application of the RSA accumulator. However, this construction is presented to give some intuition about the following section that refers to dynamic sets.

3.5 Authenticating Dynamic Hash Tables

This section describes how to use the authentication structure that is based on the accumulation tree to authenticate a dynamic hash table. First the general algorithms and protocols for the three-party model are described, and then the results are extended to the two-party model.

Let $0<\epsilon<1$ be a fixed constant. The general idea behind this approach for using the accumulation tree to authenticate hash tables is the following. Let $S=\{e_1, e_2, \ldots, e_n\}$ be the set of elements one would like to authenticate. Instead of building the accumulation tree $T(\epsilon)$ on the elements themselves, as was done in the case of static sets, consider the elements to be in a hash table that has O(n) buckets, where each bucket contains O(1) elements, and build the accumulation tree over the buckets. As in the static case, since the size of each bucket is constant, the internal nodes of the accumulation tree have $O(n^{\epsilon})$ children. Therefore, one ends up building a similarly-structured accumulation tree as before, except that now each leaf of the accumulation tree holds the prime representative of the accumulation value of the elements in the bucket corresponding to this leaf (instead of one corresponding element stored at this leaf before).

In particular, consider a bucket L that contains the elements $x_1, x_2, \ldots, x_h$, where $h=O(1)$ (i.e., these elements are mapped to the same bucket through the function used by the hash table to uniformly place the elements in the buckets). The accumulated bucket value of bucket L, denoted $A_L$, is defined as follows:

$$A_L = g_1^{r1(x_1)r1(x_2)\cdots r1(x_h)} \mod N_1.$$

The accumulated bucket value is computed for each bucket and an accumulation tree is built over the resulting O(n) accumulated bucket values. Note that by doing so, in essence, one adds one additional level of accumulations in the accumulation tree. That is, instead of using $$l = \left\lceil \frac{1}{\epsilon} \right\rceil$$

levels of accumulations, one is now using $l'=l+1$ levels. At the additional (lowest) level, the number of elements that are accumulated is O(1).

Queries and verification. Suppose one wants to construct the membership proof for an element $X \in S$. Let $v_0, v_2, \ldots, v_{l'}$ be the path from x to the root r of the tree, $r=v_{l'}$. As before, the proof $\Pi(x)$ is the ordered sequence $\pi_1, \pi_2, \ldots, \pi_{l'}$, where $\pi_i$ is defined in Equation 3. In order to achieve constant-time queries one must avoid computing $\pi_i$ repeatedly for every separate query, and therefore precomputed witnesses are stored. Namely, for every non-leaf node v of the accumulation tree (consider as leaves the elements within the buckets) that lies in level $1 \le i \le l'$, let N(v) be the set of its children. For every $j \in N(v)$ store at node v the witness $$A_j^{(v)} = g_i^{\Pi_{u \in N(v) - (j)} r_i(\chi(u))} \mod N_i.$$

Therefore, when one queries for x, the server follows the path $v_0, v_1, \ldots, v_{l'}$ and collects the corresponding precomputed witnesses $\beta_1 = A_{j_1}^{(v_1)}, \beta_2 = A_{j_2}^{(v_2)}, \ldots, \beta_{l'} = A_{j_{l'}}^{(v_{l'})}$ for some and as defined in Equation 4. Since the depth of the tree is constant $$\left(\left\lceil \frac{1}{\epsilon} \right\rceil + 1\right),$$

the time needed to construct the proof and thus answer a query is O(1). (Define query time to be the time needed to construct the proof and not the time to search for the specific element, which can be achieved with another hash table data structure in expected constant time.) Finally, proof verification is performed exactly according to Equations 5 and 6 and, thus, this takes O(1) time.

Updates. It is now described how one can efficiently support updates in the authenticated hash table. Suppose the hash table currently holds n elements and the source wants to insert an element x in the hash table. That element is inserted into a certain bucket L. Let $v_0, v_1, \ldots, v_{l'}$ be the path from the newly inserted element to the root of the tree. The goal of the update algorithm is twofold:
1. All the RSA digests $\chi(v_i)$, $0 \le i \le l'$ (note that $\chi(v_0)=x$) and respective prime representatives $r_i(\chi(v_{i-1}))$ ($i=1, \ldots, l'$) along the path from bucket L to the root of the tree, need to be updated;
2. For all nodes $v_i$, $1 \le i \le l'$, one has to update the witnesses $A_j^{(v_i)}$ where $j \in N(v_i)$. This is required to maintain the query complexity constant.

In order for the first requirement to be satisfied, whenever an update is performed, the RSA digests can be updated by the source and sent to the server as part of the update authentication information. The source also sends the updated (new) prime representatives too, i.e., the values $r_i(\chi(v_{i-1}))$ for all $i=1, \ldots, l'$. In this way the untrusted server does not compute them from scratch but just replaces the old ones with the ones received. To satisfy the second requirement, use the following result from [39] for efficiently maintaining updated precomputed witnesses and overall achieving constant query time.

Lemma 4 (Updating precomputed witnesses [39]) Let N be an RSA modulus. Given the elements $x_1, x_2, \ldots, x_n$, N and g, without the knowledge of $\phi(N)$, one can compute $A_i = g^{\prod_{j \neq i} x_j}$ mod N for $i=1, \ldots, n$ in $O(n \log n)$ time.

In order to compute the updated witnesses, the server uses the algorithm in [39] that provides the above result for all nodes $v_i$, $1 \leq i \leq l'$ as follows. For each $v_i$ (recall that $v_i$ is the node on the path of the update), it uses the algorithm with inputs the elements $r_i(\chi(j))$ for $j \in N(v_i)$, the RSA modulus $N_i$ and the exponentiation base $g_i$. In this computation the updated prime representative $r_i(\chi(v_{i-1}))$, where $v_{i-1} \in N(v_i)$, that was received by the source, is used. This computation outputs the witnesses $A_j^{(v_i)}$ where $(v_i, j) \in N(v_i)$ (note that the witness $A_{v_{i-1}}^{(v_i)}$ remains the same). Also, since it is run on $O(1/\in)$ nodes v with $|N(v)| = O(n^\in)$, one has, by Lemma 4, that the witnesses can be updated in $O(n^\in \log n)$ time (for the complete result see Lemma 5 below).

However, since one is using a hash table (with O(n) buckets) one should expect that at some point one will need to rebuild the table (i.e., rehash all the elements and reinsert them in a bigger or smaller hash table). This is done as follows. During the evolution of the data structure, maintain a hash table that can always store more elements than the currently stored elements. Call the number of the elements that can be stored in the hash table in use "capacity" (the capacity can also be viewed as the number of buckets of the hash table). Let $M_i$ be the capacity of the hash table after update i and $m_i$ be the number of the elements actually stored in the hash table after update i. Note that whenever one has an update in the hash table, it is $m_i = m_{i-1} \pm 1$ and whenever update i causes a rebuild of the hash table it is $M_i \neq M_{i-1}$. In order to ensure that the complexity results are maintained one has to make sure that $$\frac{M_i}{4} \leq m_i \leq M_i.$$

If $m_i$ violates the above bounds, one must rebuild the hash table from scratch. The general policy followed is given in the following definition:

Definition 6 (Rebuilding the hash table) Define $$\alpha_i = \frac{m_i}{M_i}$$

to be the load factor of the authenticated hash table after update i. If $\alpha_i = 1$ (full table) double the capacity of the hash table. If $\alpha_i = \frac{1}{4}$ (near empty table) halve the capacity of the hash table.

The rebuilding method described in Definition 6, adjusted to the exemplary authenticated hash table construction, is essential to get the necessary amortized results of Lemma 5 which constitutes the main complexity result of this work (for similar methods see [13]).

Lemma 5 Let $0 < \in < 1$ be a fixed constant. Given a hash table for n elements with O(n) buckets of expected size O(1) and the accumulation tree $T(\in)$ built on top of it, one can support updates in $O(n^\in \log n)$ expected amortized time without the knowledge of $\phi(N_i)$ ($i = 1, \ldots, l'$) by using the rebuilding policy of Definition 6.

Proof: Suppose there are currently n elements in the hash table and that the capacity of the table is M. Note that $M/4 \leq n \leq M$. As known, there are M buckets and each bucket stores O(1) elements in expectation. When an update takes place and no rebuilding of the table is triggered, one has to update all the witnesses along the path of the update of the accumulation tree. By using the algorithm described in Lemma 4, one can update the witnesses within the bucket in expected time O(1), since the size of the bucket is an expected value. The witnesses of the internal nodes can be updated in time $O(M^\in \log M)$ and therefore the overall time is $O(M^\in \log M)$ in expectation. When a rebuilding of the table is triggered then the total time needed is $O(M \log M)$ since there is a constant number of levels in the accumulation tree, the time one needs to spend at each node is $O(n^\in \log n)$ (since the degree of any internal node is $O(n^\in)$) and the maximum number of nodes that lie in any level is $O(n^{1-\in})$. Therefore the actual cost of an update is expected $O(M^\in \log M)$, when no rebuilding is trigerred and $O(M \log M)$ otherwise. Consider the expected value of the amortized cost (expected amortized cost) of an update. Perform the analysis by defining the following potential function:

$$F_i \begin{cases} c(2m_i - M_i)\log M_i, & \alpha_i \geq \frac{1}{2} \\ c\left(\frac{M_i}{2} - m_i\right)\log M_i, & \alpha_i < \frac{1}{2}. \end{cases}$$

The amortized cost for an update i will be equal to $\hat{\gamma}_i = \gamma_i + F_i - F_{i-1}$. Therefore $E[\hat{\gamma}_i] = E[\gamma_i] + F_i - F_{i-1}$, since $F_i$ is a deterministic function. To do the analysis more precisely, define some constants. Let $c_1$ be a constant such that if the update cost C is $O(M_i^\in \log M_i)$, it is $$C \leq c_1 M_i^\in \log M_i. \tag{7}$$

Also, let $r_1$ be a constant such that if the rebuilding cost R is $O(m_i \log m_i)$, it is $$R \leq r_1 m_i \log m_i. \tag{8}$$

Also note that in all cases it holds $$\frac{M_i}{4} \leq m_i \leq M_i. \tag{9}$$

Perform the analysis by distinguishing the following cases:
1. $\alpha_{i-1} \geq \frac{1}{2}$ (insertion). For this case, examine the cases where the hash table is rebuilt or not. In case the hash table is not rebuilt, one has $M_{i-1} = M_i$ and $m_i = m_{i-1} + 1$. Therefore the amortized cost will be:

$$E[\hat{\gamma}_i] = E[\gamma_i] + F_i - F_{i-1} \leq c_1 M_i^\in M_i c(2m_i - M_i - 2m_{i-1} + M_{i-1}) \log M_i = c_1 M_i^\in \log M_i + 2c \log M_i.$$

In case the hash table is now rebuilt (which takes O(n log n) time in total), one has $M_i = 2M_{i-1}$, $m_i = m_{i-1} + 1$ and $m_{i-1} = M_{i-1}$ (which give $m_i = M_i/2 + 1 \leq M_i/2$) and the amortized cost will be:

$$E[\hat{\gamma}_i] = E[\gamma_i] + F_i - F_{i-1} \leq r_1 m_i \log m_i + c(2m_i - M_i)\log M_i - $$
$$c(2m_{i-1} - M_{i-1})\log M_{i-1}$$
$$= r_1 m_i \log m_i + c(2m_i - M_i)\log M_i - c\frac{M_i}{2}\log M_i/2 \leq$$
$$r_1 \frac{M_i}{2}\log M_i/2 + 2c\log M_i - c\frac{M_i}{2}\log M_i/2 \leq$$
$$2c\log M_i$$

for a constant c of the potential function such that $c > r_1$.

2. $\alpha_{i-1} < 1/2$ (insertion). Note that that there is no way that the hash table is rebuilt in this case. Therefore $M_{i-1}=M_i$ and $m_i=m_{i-1}+1$. If now $\alpha_i < 1/2$ the amortized cost will be:

$$E[\hat{\gamma}_i] = E[\gamma_i] + F_i - F_{i-1} \leq c_1 M_i^\epsilon \log M_i + c(M_i/2 - m_i)\log M_i -$$
$$c(M_{i-1}/2 - m_{i-1})\log M_{i-1}$$
$$= c_1 M_i^\epsilon \log M_i + c(M_i/2 - m_i - M_i/2 + m_{i-1})\log M_i$$
$$= c_1 M_i^\epsilon \log M_i - c\log M_i.$$

In case now $\alpha_i \geq 1/2$ the amortized cost will be:

$$E[\hat{\gamma}_i] = E[\gamma_i] + F_i - F_{i-1} \leq c_1 M_i^\epsilon \log M_i + c(2m_i - M_i)\log M_i -$$
$$c(M_{i-1}/2 - m_{i-1})\log M_{i-1}$$
$$= c_1 M_i^\epsilon \log M_i + c(2(m_{i-1}+1) - M_{i-1} - M_{i-1}/2 + m_{i-1})\log M_i$$
$$= c_1 M_i^\epsilon \log M_i + c(3m_{i-1} - 3M_{i-1}/2 + 2)\log M_i$$
$$= c_1 M_i^\epsilon \log M_i + c(3\alpha M_{i-1} - 3M_{i-1}/2 + 2)\log M_i$$
$$< c_1 M_i^\epsilon \log M_i + c(3M_{i-1}/2 - 3M_{i-1}/2 + 2)\log M_i$$
$$= c_1 M_i^\epsilon \log M_i + 2c\log M_i.$$

3. $\alpha_{i-1} < 1/2$ (deletion). Here one has $m_i=m_{i-1}-1$. In case the hash table does not have to be rebuilt (i.e., $1/4 < \alpha_i < 1/2$ and $M_i=M_{i-1}$), one has that the amortized cost of the deletion is going to be:

$$E[\hat{\gamma}_i] = E[\gamma_i] + F_i - F_{i-1} \leq c_1 M_i^\epsilon \log M_i + c(M_i/2 - m_i)\log M_i -$$
$$c(M_{i-1}/2 - m_{i-1})\log M_{i-1}$$
$$= c_1 M_i^\epsilon \log M_i + c(M_i/2 - m_i - M_i/2 + m_{i-1})\log M_i$$
$$= c_1 M_i^\epsilon \log M_i + c\log M_i.$$

In case now the hash table has to be rebuilt (which takes time $O(m_i \log m_i)$), one has that $M_i = M_{i-1}/2$, $M_i = 4 m_i$ and therefore the amortized cost is:

$$E[\hat{\gamma}_i] = E[\gamma_i] + F_i - F_{i-1} \leq$$
$$r_1 m_i \log m_i + c(M_i/2 - m_i)\log M_i - c(M_{i-1}/2 - m_{i-1})\log M_{i-1} \leq$$
$$r_1 m_i \log m_i + c(M_i/2 - m_i)\log M_i - c(M_i - (m_i+1))\log 2M_i \leq$$
$$r_1 m_i \log m_i - c(M_i/2 - 1)\log M_i - c(3m_i - 1) \leq$$
$$r_1 m_i \log m_i - cM_i/2\log M_i + c\log M_i \leq$$
$$r_1 M_i \log M_i - (c/2)M_i \log M_i + c\log M_i \leq c\log M_i,$$

where c must also be chosen to satisfy $c > 2r_1$.

4. $\alpha_{i-1} \geq 1/2$ (deletion). In this case one has $M_{i-1}=M_i$. If $\alpha_i \geq 1/2$, the amortized cost will be:

$$E[\hat{\gamma}_i] = E[\gamma_i] + F_i - F_{i-1} \leq c_1 M_i^\epsilon \log M_i + c(2m_i - M_i - 2m_{i-1} + M_{i-1})\log M_i \leq c_1 M_i^\epsilon \log M_i - 2c\log M_i.$$

Finally for the case that $\alpha_i < 1/2$ one has $$E[\hat{\gamma}_i] = E[\gamma_i] + F_i - F_{i-1} \leq c_1 M_i^\epsilon \log M_i +$$
$$c(M_i/2 - m_i - 2m_{i-1} + M_{i-1})\log M_i$$
$$= c_1 M_i^\epsilon \log M_i + c(3M_{i-1}/2 - (m_{i-1} - 1) - 2m_i)\log M_i$$

-continued
$$= c_1 M_i^\epsilon \log M_i + c(3M_{i-1}/2 - 3m_{i-1} + 1)\log M_i$$
$$= c_1 M_i^\epsilon \log M_i + c(3(1/\alpha_{i-1})m_{i-1}/2 - 3m_{i-1} + 1)\log M_i \leq$$
$$c_1 M_i^\epsilon \log M_i + c\log M_i.$$

Therefore one can conclude that for all constants $c > 2r_1$ of the potential function, the expected value of the amortized cost of any operation is bounded by $$E[\hat{\gamma}_i] \leq c_1 M_i^\epsilon \log M_i + 2c \log M_i.$$

By using Equation 9, there is a constant r such that $E[\hat{\gamma}_i] \leq rm_i^\epsilon \log m_i$ which implies that the expected value of the amortized cost of any update (insertion/deletion) in an authenticated hash table containing n elements is $O(n^\epsilon \log n)$ for $0 < \epsilon < 1$.

Note that so far the results presented refer to positive hash table queries (i.e., hash table queries made for elements that exist in the set). Below is described how one can support non-membership queries as well. This will be done by using positive membership queries: In each bucket L, maintain all elements $y_i \in L$ sorted—in case elements are drawn from an unordered universe, one first applies a cryptographic hash function to impose some order on the elements. Let $y_1, y_2, \ldots, y_{|L|}$ be the elements stored in a bucket L in increasing order. Instead of computing prime representatives of $y_i$ compute prime representatives of the $|L|+1$ intervals $(y_i, y_{i+1})$ for $i=0, \ldots, |L|$, where $y_0$ and $y_{|L|+1}$ denote $-\infty$ and $+\infty$, respectively. The proof of non-membership for an element $x \in (y_i, y_{i+1})$ is equivalent to the proof of membership for interval $(y_i, y_{i+1})$. As the bucket size is maintained to be $O(1)$ the query complexity is expected to be $O(1)$ for non-membership queries as well (note that in general, this construction adds an $O(\log k)$ overhead in the update time for k-sized buckets but in this case it does not matter since the buckets are of constant size). Note that one does not impose an ordering across all the elements stored in the hash table. A total ordering would increase the complexity and would not take advantage of the fact that one is using a hash table.

The main result of this section (for the three-party model) is as follows:

Theorem 5 Let $0 < \epsilon < 1$ be a fixed constant. Under the strong RSA assumption, one can use the accumulation tree and the RSA accumulator with precomputed witnesses to authenticate a dynamic hash table of n elements in the three party model by storing a data structure of size $O(n)$ at both the source and the server such that:

1. The scheme is secure according to Definition 4;
2. The expected amortized update time at the server is $O(n^\epsilon \log n)$;
3. The expected amortized update time at the source is $O(1)$;
4. The expected query time is $O(1)$;
5. The size of the proof is $O(1)$;
6. The verification time is $O(1)$;
7. The client keeps space $O(1)$;
8. The update authentication information has size $O(1)$.

Proof: The security of the exemplary scheme is derived by Theorem 3. The complexity of the update time at the server is derived by the amortized analysis in Lemma 5. For the update time at the source (which involves computation of the new RSA digests and prime representatives along the path of the update), one can use the fact that the source knows $\phi(N_i)$ in order to derive the constant amortized time: Suppose the source wants to insert/delete element x in bucket L. Let $d_1, d_2, \ldots, d_l$ be the RSA digests along the path from x to the root ($d_1$ is the RSA digest of the certain bucket and $d_1$ is the root RSA digest). The source first computes the new value of the bucket $d_1$, by exponentiating to $r_1(x)$ (insertion) or to $r_1(x)^{-1}$ (deletion) and then reducing modulo $N_1$. Note that this is always feasible to compute, since the source knows $\phi(N_1)$. Next, for each $i=2, \ldots, l$, the source computes $d_i'$ by exponentiating $d_i$ to the product $r_i(d_{i-1})^{-1} r_i(d_{i-1}')$ (where $r_i(d_{i-1}')$ is the new prime representative computed and which will be sent to the server) and then reducing modulo $N_i$. Therefore, the total update time is $O(1)$ since $l$ is $O(1)$. However, rebuilding the hash table is needed and the expected amortized time will be in this case $O(1)$ (one can prove that by using a potential function that does not contain the logarithmic factor of the potential function used in Lemma 5). The query time at the server is expected to be $O(1)$ since the server can use another hash table (note that the update time of this hash table does not influence the amortized analysis of Lemma 5) to pick the correct witness at every node of the accumulation tree. (5), (6) and (7) are derived as in Theorem 4. The update authentication information contains all the RSA digests along the path of the update, the respective new prime representatives and a constant size signature of the root RSA digest: The size of the path is constant and each RSA digest/prime representative is a number reduced modulo $N_i$, which occupies $O(1)$ space. Therefore the update authentication information is $O(1)$. Finally, in order to implement a complete authenticated hash table, one has to authenticate non-membership queries as well. This is done by keeping elements sorted in the buckets which, as seen before, does not increase the complexity due to the constant-sized buckets.

Finally, note that if one restricts oneself to the three-party model, one can achieve constant expected amortized update time at the untrusted server too, by keeping the update authentication information constant and increasing the query time to expected $O(n^\in)$:

Theorem 6 Let $0<\in<1$ be a fixed constant. Under the strong RSA assumption, one can use the accumulation tree and the RSA accumulator without precomputed witnesses to authenticate a dynamic hash table of n elements in the three party model by storing a data structure of size $O(n)$ at both the source and the server such that:
1. The scheme is secure according to Definition 4;
2. The expected amortized update time at the server is $O(1)$;
3. The expected amortized update time at the source is $O(1)$;
4. The expected query time is $O(n^\in)$;
5. The size of the proof is $O(1)$;
6. The verification time is $O(1)$;
7. The client keeps space $O(1)$;
8. The update authentication information has size $O(1)$.

Proof: (1), (3), (5), (6), (7) and (8) are derived as in Theorem 5. The server, whenever there is an update, does not have to do anything: It just receives the updated digests and prime representatives from the source and uses them to overwrite the previous ones. Therefore the update time for the server is the same as with the update time for the source. As for the query time, the server computes the witnesses online, i.e., it performs $O(n^\in)$ exponentiations for the internal nodes of the accumulation tree and $O(1)$ exponentiations (in expectation) for the buckets. Therefore the query time is expected $O(n^\in)$.

As will be seen next, Theorem 6 also applies to the two-party model provided one adds an extra round of communication between the client and the server. Finally, note that one can choose the scheme best suited for the application of interest: in particular, one can use the scheme of Theorem 5 for applications where updates are rare and queries are frequent, whereas one can use the scheme of Theorem 6 for applications where updates are much more frequent than queries (e.g., auditing).

3.6 Two-Party Model

This section describes how to implement an authenticated hash table using the accumulation tree with precomputed witnesses in the two-party model. Recall that the two-party model has the following main differences from the three-party model:
1. The client locally stores (and updates) the RSA digest and does not receive a signed RSA digest from the trusted source, as it happens in the three party model;
2. The client is not only issuing queries to the untrusted server but is also issuing updates;
3. There is no trusted party and no PKI is used.

In the two-party model, the untrusted server also computes the new prime representatives whenever there is an update. This is possible since the information used to compute prime representatives is included in the public key pk. Also recall that, as discussed at the end of Section 2.4, it is very important, after the client issues an update transforming the set of elements from S to S', that the client correctly updates the local digest to a new one that is consistent with the new set S'. This is crucial for the security of a set-membership authentication scheme; and although this can be trivially achieved in the three-party model where the source computed the new digest over the new locally stored set S', it is more challenging to achieve in the two-party model where the client does not locally store the data set.

Consider now the case where the untrusted server stores the current set S and the augmented accumulation tree built on it which in particular includes the prime representatives of all the RSA digests. Assuming that the client stores the correct RSA digest d(S) of the set S and that the server uses precomputed witnesses at every node of the accumulation tree, it is easy to see that set-membership queries for any given element can be answered and verified exactly in the same way as in the three-party model; namely, a query takes $O(1)$ expected time and a verification takes $O(1)$ time. Thus one only needs to describe how updates are handled and, in particular, how the client can correctly update the set digest, thus maintaining the invariant that at all times the client locally stores the correct set digest, i.e., a digest that corresponds to the exact history of updates in the set. In what follows, details are given regarding updates in the two-party model.

Updates. Suppose the client issues the update delete(x) to set S resulting in set S', and let $v_0, v_1, \ldots, v_{l'}$ be the nodes of the accumulation tree from the node $v_0$ that stores x to the root of the accumulation tree. The update protocol needs to achieve two goals: the server needs to perform the update and the client needs to compute the new digest and verify the update performed by the server. While the server performs the update, it also constructs a consistency proof that is given to the client in order for the client to perform its digest update and verification.

In particular, the server initially treats the update as a membership query for element x and constructs the membership proof for x as defined in Equations 3 and 4, i.e., the pairs of prime representatives and branch witnesses $(\alpha_i, \beta_i)$ for $i=1, \ldots, l'$. Then the server performs the update as in the three-party model (i.e., computing new witnesses, RSA digests and prime representatives along the update path). Let $\alpha_i'$ for $i=2, \ldots, l'$ be the new prime representatives computed by the server (note that since x has been removed there is no new prime representative for x). The consistency proof that the server sends to the client, which corresponds to the performed update, consists of the following two components:

1. The set of pairs $(\alpha_i, \beta_i)$ for $i=1, \ldots, l'$, which is a verification proof for x in S (i.e., the set before the update);
2. The set of new prime representatives $\alpha_i'$ for $i=2, \ldots, l'$.

Distinguish between the two kinds of proofs returned by the server: After a query, as seen also in the three-party model, the server returns a verification proof; while after an update, the server returns a consistency proof which in fact includes a verification proof for the updated element (plus the new prime representatives along the update path).

After receiving the consistency proof, the client performs the following. First, it verifies the verification proof as in Equations 5 and 6. If the verification accepts, the client, apart from knowing that $x \in S$, can also compute the correct RSA digests of nodes $v_1, \ldots, v_{l'}$ by setting $$\chi(v_i) = \beta_i^{\alpha_i} \bmod N_i,$$

for all $i=1, \ldots, l'$. Note that these are the correct RSA digests corresponding to S, i.e., the set before the removal of x. These digests must be updated to reflect the removal of x and thus locally replace the old RSA digest $\chi(v_{l'})$ with the new RSA digest $\chi'(v_{l'})$ of the root of the accumulation tree corresponding to S'. In order to compute and verify this new digest the client uses the prime representatives $\alpha_i'$, for $i=2, \ldots, l'$ and the old already verified RSA digests $\chi(v_i)$, for $i=1, \ldots, l'$, as follows. One-by-one, and since the client knows the trapdoor information $\phi(N_i)$ for $i=1, \ldots, l'$, the client can efficiently update $\chi(v_i)$ to $\chi'(v_i)$ first by setting $$\chi'(v_1) = \chi(v_1)^{\alpha_1^{-1}} \bmod N_1, \quad (10)$$

therefore computing the correct updated RSA digest of node $v_1$. Then the client sets $$\chi'(v_i) = \chi(v_i)^{\alpha_i^{-1} \alpha_i'} \bmod N_i, \quad (11)$$

for $i=2, \ldots, l'$. In Equation 11, since $\chi(v_i)$ and $\alpha_i$ have been verified to be the correct corresponding values of the accumulation tree before the update, it suffices for the client to verify that $\alpha_i'$ is the correct new prime representative after the update. To achieve that, the client firstly verifies that $\alpha_i'$ is a $3|N_i|-1$-bit prime number (this is feasible with an efficient primality check) and also that $$h_i(\alpha_i') = \chi'(v_{i-1}), \quad (12)$$

for $i=2, \ldots, l'$. By the fact that $\chi'(v_1)$ is provably correct by Equation 10, the client can verify the correctness of $\alpha_2'$ by Equation 12 for $i=2$, and therefore verify the correctness of $\chi'(v_2)$ by Equation 11. By following this chain of computations the client ends up computing the provably correct updated digest $\chi'(v_{l'})$ with non-negligible probability (due to the security of the verification test), as required by the security definition, i.e., the client, after any update provably possesses the correct updated digest with non-negligible probability. The insertion of an element can be performed similarly.

Finally note that when the server rebuilds the hash table, the client has to receive all the elements, verify them, rebuild the hash table by computing new prime representatives and send everything over to the server. This will provide the amortized results in Theorem 7. Now presented is the main result for the two-party model:

Theorem 7 Let $0 < \epsilon < 1$ be a fixed constant. Under the strong RSA assumption, one can use the accumulation tree and the RSA accumulator with precomputed witnesses to authenticate a dynamic hash table of n elements in the two-party model by storing a data structure of size $O(n)$ such that:
1. The scheme is secure according to Definition 4;
2. The expected amortized update time at the server is $O(n^\epsilon \log n)$;
3. The amortized update time at the client is $O(1)$;
4. The expected query time is $O(1)$;
5. The size of the verification proof is $O(1)$;
6. The amortized size of the consistency proof is $O(1)$;
7. The verification time is $O(1)$;
8. The client keeps space $O(1)$.

Proof: The security in the two-party model is derived by Theorem 3 and by the fact that a way is provided for the client to update the digest whenever the client issues an update, with non-negligible probability (see the protocol in the above description). The update time at the server is derived by Lemma 5 (use of precomputed witnesses). Verification time, verification proof size and query time are derived as in Theorem 5. The consistency proof has $O(1)$ amortized size, since there will be an update by the client that will trigger a rebuilding of the hash table, thus making the server send all the elements over to the client. This also makes the update time at the client to be amortized $O(1)$, by following a similar amortized analysis as in Lemma 5.

We now present the result that uses on-line witness computation in the two party model:

Theorem 8 Let $0 < \epsilon < 1$ be a fixed constant. Under the strong RSA assumption, one can use the accumulation tree and the RSA accumulator without precomputed witnesses to authenticate a dynamic hash table of n elements in the two-party model by storing a data structure of size $O(n)$ such that:
1. The scheme is secure according to Definition 4;
2. The expected amortized update time at the server is $O(1)$;
3. The amortized update time at the client is $O(1)$;
4. The expected query time is $O(n^\epsilon)$;
5. The size of the verification proof is $O(1)$;
6. The amortized size of the consistency proof is $O(1)$;
7. The verification time is $O(1)$;
8. The client keeps amortized space $O(1)$.

Proof: The security in the two-party model is derived by Theorem 3. In this scenario it is assumed that the server always keeps the digests updated and therefore, the server can compute witnesses online in expected $O(n^\epsilon)$ time. Again, the query time is expected due to the expected bound on the capacity of the buckets. Now described is the extension in the communication protocol so that the update time at the server is constant. Whenever the client issues an update, the server sends back a consistency proof as in Theorem 7. However, the server does not do the update as before. After the client verifies the proof, the client computes new prime representatives along the path (note that this can be done in constant time) of the update and sends the new digests to the server. The server, receives the digests and overwrites the old ones in constant time. That keeps the update time constant and introduces another round of communication between the client and the server.

3.7 A More Practical Scheme

The solution presented so far uses different RSA moduli for each level of the tree, where as one moves higher in the tree, each new RSA moduli has a bit-length that is three times longer than the bit-length of the previous-level RSA moduli. Therefore, computations corresponding to higher levels in the accumulation tree are more expensive since they involve modular arithmetic operations over longer elements. This increase in the lengths of the RSA moduli is due to the need to compute, for the elements stored at every level in the tree, prime representatives of a size that is three times as large as the size of the elements (see Lemma 1). Although from a theoretical point of view this is not a concern as the number of levels of the tree is constant (i.e., $1/\epsilon$), from a practical point of view this can be prohibitive for efficiently implementing the exemplary schemes.

To overcome this complexity overhead, use the same RSA modulus for each level of the tree, and, to achieve this, presented herein is a heuristic inspired by a similar method originally used in [4]. Instead of using two-universal hash functions to map (general) integers to primes of increased size, the idea is to employ random oracles [5] for consistently computing primes of relatively small size. In particular, given a k-bit integer x, instead of mapping it to a 3k-bit prime, one can map it to the value $2^t 2^b g(x)+d$, where $g(x)$ is the output of length b of a random oracle (which in practice is the output of a cryptographic hash function) at the end of which one appends b zeros so that one makes this number large enough, t is a value that equals to the number of bits one is shifting $2^b g(x)$ to the left, and $d=1, 3, \ldots, 2^t-1$ is a number being added so that $2^t 2^b g(x)+d$ is a prime. Note that it is required that t is related to b according to Equation 13 of Theorem 9.

In the following, denote by $q(x)$ a prime representative of x computed by the above procedure, i.e., the output of a procedure that transforms a k-bit integer into a k'-bit prime, where $k' < k$. Note that the above procedure (i.e., the computation of $q(x)$) cannot map two different integers to the same prime. This can be derived by the random oracle property, namely that for $x_1 \neq x_2$, with high probability it is $g(x_1) \neq g(x_2)$. This implies that the intervals $[2^t 2^b g(x_1), 2^t 2^b g(x_1)+2^t-1]$ and $[2^t 2^b g(x_2), 2^t 2^b g(x_2)+2^t-1]$ are disjoint. Finally it is shown that one can make sure that with high probability one will always be able to find a prime within the specified interval.

Theorem 9 Let x be a k-bit integer and let $a=2^b g(x)$ be the output of a b-bit random oracle with b zeros appended at the end. The interval $[2^t a, 2^t a+2^t-1]$ contains a prime with probability at least $1-2^{-b}$ provided $$b \leq \lfloor \log(1+\sqrt{2^t+4e^{2^t-1}})-1 \rfloor. \quad (13)$$

Proof: By the Prime Distribution Theorem one has that the number of primes less than n is approximately $$\frac{n}{\ln n}.$$

Therefore, one wants to compute the probability $$Pr\left[\frac{2^t a + 2^t - 1}{\ln(2^t a + 2^t - 1)} - \frac{2^t a}{\ln(2^t a)} \geq 1\right] = Pr\left[a \leq \frac{e^{2^t-1}}{2^t}\right],$$

by assuming $\ln(2^t a+2^t-1) \approx \ln(2^t a)$ since $a > 2^b \gg 2^t$. By the random oracle property one has that $$Pr\left[a \leq \frac{e^{2^t-1}}{2^t}\right] = Pr\left[2^b g(x) \leq \frac{e^{2^t-1}}{2^t}\right] = \frac{e^{2^t-1}}{2^{b+t}} \frac{1}{2^b}.$$

Note that $$\frac{e^{2^t-1}}{2^{b+t}} \frac{1}{2^b} \geq 1 - \frac{1}{2^b} \Leftrightarrow \frac{1-\sqrt{2^t+4e^{2^t-1}}}{2} \leq 2^b \leq \frac{1+\sqrt{2^t+4e^{2^t-1}}}{2},$$

which gives $b \leq \lfloor \log(1+\sqrt{2^t+4e^{2^t-1}})-1 \rfloor$ since b is a positive integer.

Using Theorem 9, one can pick the length of the output of the random oracle to ensure hitting a prime with high probability. For example, for $t=9$ one gets $b \leq 368$, which is true for most practical hash functions used today (e.g., SHA-256).

Using the above method, one can still accumulate primes in the exponent but this time without having to increase the size of the RSA moduli at any level of the tree. The only conditions one needs in order to securely use the RSA accumulator are:

1. the safe accumulation of primes that map to unique integers (i.e., each accumulated prime can only represent one integer), and
2. the bit-length of accumulated primes is smaller than the bit-length of the used RSA modulus.

Thus, one can apply the exemplary new procedure for computing prime representatives to all of the constructions in Section 3 with one important efficiency improvement: the same RSA moduli and exponentiation bases are used at all levels of the accumulation tree. With this heuristic, one achieves the same security and complexity results as before, but now one has a more practical accumulator with security that is now based on both the strong RSA and the random oracle assumptions.

4 Scheme Based on the Bilinear-Map Accumulator

This section uses the bilinear-map accumulator to construct authenticated hash tables. The same methodology is used as in Section 3, that is, nested invocations of accumulators in a constant-depth tree, to overall obtain similar complexity and security results with the solution presented before. Accordingly, the same structure is used in presenting and proving the results.

4.1 System Setup

The setup for this solution is simpler than the authenticated hash tables based on the RSA accumulator. As will be seen, at every level, the digests are elements of the same group and not of different groups as was the case with the nested applications of the RSA accumulators. To achieve that, one uses a collision resistant hash function h that takes as input elements of the multiplicative cyclic group and outputs an element in $Z_p^*$.

Therefore, in the two-party model, the client picks an exponentiation base g that is a generator of a multiplicative cyclic group G of prime order p. Then the client randomly picks a number $s \in Z_p^*$ and keeps that secret (trapdoor information). The generator g is used as the exponentiation base in all the levels as well. All the above are chosen uniformly at random as indicated by Definition 3 (basically the client has to generate the tuple $t=(p, G, G_M, e, g)$). Finally, the client decides on an upper bound q of the total number of elements that will be accumulated and sends the numbers $g, g^s, g^{s^2}, \ldots, g^{s^q}$ to the untrusted server.

In the three-party model, one has the same setup with the difference that the source is responsible for choosing $p, G, G_M, e, g$ and $s$. Everything is made public (both to the servers and to the client) except for the trapdoor information s, which is crucial for the security of the scheme.

Finally, in both models, use a collision resistant hash function h: $G \to Z_p^*$. In this way, one ensures that the output accumulated value can be used as input to the next level of accumulation, since one can only accumulate elements of $Z_p^*$ and not elements of G. The collision resistance hash function h serves as the respective "prime representative" function used in Section 3, with the difference that there is no constraint that the output should be a prime number: it suffices that the output is a number in $Z_p^*$.

4.2 Main Authenticated Data Structure

Let S be the set one would like to authenticate. The elements of the set are integers belonging to $Z_p^*$. Similarly with the RSA construction, one can hierarchically employ the bilinear-map accumulator over set S. Therefore, for any tree node ν one defines an accumulation value ψ(ν) of node ν, recursively along the tree structure: For every leaf node ν in tree T(∈) that stores element e, set ψ(ν)=e, while for every non-leaf node ν in T(∈) that lies in level 1≤i≤l, set:

$$\psi(v) = g^{\prod_{u \in N(v)} (h(\psi(u)) + s)}, \quad (14)$$

where ψ(u) is the bilinear digest of node u (which is an element of the multiplicative cyclic group G), N(ν) is the set of children of node ν, g is the generator of the multiplicative group G, s is the trapdoor information that is kept secret and $h(\psi(u)) \in Z_p^*$; is a cryptographic hash of ψ(u), computed with the collision resistant hash function h that was introduced before.

Definition 7 Given a set S={$e_1, e_2, \ldots, e_n$} of n elements in $Z_p^*$, a multiplicative group G of prime order p and the accumulation tree T(∈) built on top of them, define the bilinear digest of any node ν of the accumulation tree to be equal to ψ(ν), also denoted with ψ($S_v$), where $S_v$ is the set that is defined by the subtree rooted at ν. The bilinear digest of the set S is equal to ψ(r), where r is the root of tree T(∈).

For simplicity, use both ψ($S_v$) and ψ(ν) to denote the bilinear digest of node ν, $S_v$ being the set of elements contained in the subtree rooted at node ν. In the following the main collision-resistance property of the above authentication structure is proven.

Theorem 10 (Collision resistance) Let k be the security parameter and U={$u_1, u_2, \ldots, u_n$} a set of n elements. Given the associated accumulation tree T(∈) built on top of U, under the q-strong Diffie-Hellman assumption, the probability that a computationally bounded adversary A, knowing only the bilinear pairings parameters t=(p, G, $G_M$, e, g) and the elements of $G_M$ g, $g^s$, $g^{s^2}$, ..., $g^{s^q}$ (q≥n) for some s chosen at random from $Z_p^*$, can find another set V≠U such that ψ(V)=ψ(U) is neg(k).

Proof: As in Theorem 2, the following claim is proven by induction: Given an accumulation tree of l levels, it is difficult for a computationally bounded adversary to find two different sets U, V such that $\psi_1(U)=\psi_1(V)$, where $\psi_1(S)$ is the bilinear digest that is computed using an l-level accumulation tree on set S. For the base case l=1 the claim trivially holds by Lemma 3; in particular, one has that for any sets U≠V it holds:

$$Pr[\psi_1(U)=\psi_1(V) \wedge U \neq V] \leq v(k),$$

where v(k) is the appropriate negligible function that one gets from Lemma 3. Suppose the claim holds for l=i, i.e., for any sets U≠V for the inductive case one has $$Pr[\psi_i(U)=\psi_i(V) \wedge U \neq V] \leq v(k).$$

Let now $$\Psi_{i+1}(U) = g^{(h(\psi_i(U_1))+s)(h(\psi_i(U_2))+s) \ldots (h(\psi_i(U_t))+s)}$$

for $U_1, U_2, \ldots U_t \subseteq$ and $$\psi_{i+1}(V) = g^{(h(\psi_i(V_1))+s)(h(\psi_i(V_2))+s) \ldots (h(\psi_i(V_{t'}))+s)}$$

for $V_1, V_2, \ldots, V_{t'} \subseteq V$. Consider now the set of element in $Z_p^*$ $$P(U) = \{h(\psi_i(U_1))+s, h(\psi_i(U_2))+s, \ldots, h(\psi_i(U_t))+s\}$$

and $$P(V) = \{h(\psi_i(V_1))+s, h(\psi_i(V_2))+s, \ldots, h(\psi_i(V_{t'}))+s\}.$$

One wants to compute the probability $Pr[\psi_{i+1}(U)=\psi_{i+1}(V) \wedge U \neq V]$. By following the same logic as in the proof of Theorem 2 one has that $$Pr[\psi_{i+1}(U)=\psi_{i+1}(V) \wedge U \neq V] \leq Pr[P(U) \wedge U \neq V] + v(k).$$

Beginning now from the event P(U)=P(V) ∧ U≠V and for some permutation f of the elements in set P(V), one can derive the following implications:

$$P(U) = P(V) \wedge U \neq V \Rightarrow \bigwedge_{j=1}^{t} [h(\psi_i(U_j)) + s = h(\psi_i(V_{f(j)})) + s] \wedge U \neq V \Rightarrow$$

$$\psi_i(U_a) = \psi_i(V_{f(a)}) \wedge U_a \neq V_{f(a)}.$$

This is because one is using a collision resistant hash function h such that $h(x_1)=h(x_2) \Rightarrow x_1=x_2$ with probability 1−neg (k) (one can apply a union bound here and be even more formal by adding another v(k), i.e., the probability of finding a collision in h, to the final bound) and because there has to be some a such that $U_a \neq V_{f(a)}$ since for all i it is $U_i \subset U$ and $V_i \subset V$ and also U≠V. Since for all events A, B such that A⇒B it is Pr(A)≤Pr(B), one has that $$Pr[P(U)=P(V) \wedge U \neq V] + v(k) \leq Pr[\psi_i(U_a) = \psi_i(V_{f(a)}) \wedge U_a \neq V_{f(a)}] + v(k),$$

for some index a. By the inductive step one has $Pr[\psi_i(U_a)=\psi_i(V_{f(a)}) \wedge U_a \neq V_{f(a)}] \leq v(k)$ and therefore $$Pr[\psi_{i+1}(U)=\psi_{i+1}(V) \wedge U \neq V] \leq 2v(k),$$

which completes the proof.

4.3 Authenticating Static Sets

Similarly with the RSA accumulator, the construction of a proof for an element x is done as follows. Let $v_0, v_1, \ldots, v_l$ be the path from x to the root of T(∈), r=$v_l$. Let B(v) denote the set of siblings of node v in T(∈). The proof Π(x) is the ordered sequence $\pi_1, \pi_2, \ldots, \pi_l$, where $\pi_i$ is a tuple of an element of G, hash value and a "branch" witness (that is also an element of G), i.e., a witness that authenticates the missing node of the path from the queried node to the root of the tree, $v_l$. Thus, item $\pi_i$ of proof Π(x) (i=1, ..., l) is defined as:

$$\pi_i = (\psi(v_{i-1}), g^{\prod_{u \in B(v_{i-1})}(h(\psi(u))+s)}). \quad (15)$$

Now set $\alpha_i = \psi(v_{i-1})$ and $\beta_i = g^{\prod_{u \in B(v_{i-1})}(h(\psi(u))+s)}$. For the verification, given the proof Π(x)=$\pi_1, \pi_2, \ldots, \pi_l$ for an element x, the client verifies the membership of x in S as follows. Since the client does not know the trapdoor information s (unless in the two-party model), the client has to use the bilinear map as follows. First, the client checks to see if $\alpha_1=x$. Then, for i=2, ..., l, the client verifies that the following relation holds:

$$e(\alpha_i, g) = e(\beta_{i-1}, g^{s+h(\alpha_{i-1})}). \quad (16)$$

Note that the client can easily compute $g^{s+h(\alpha_{i-1})}$ (since $g^s$ is public) and also that, by the bilinear mapping properties, one has $$e(\beta_{i-1}, g^{s+h(\alpha_{i-1})}) = e(\beta_{i-1}^{s+h(\alpha_{i-1})}, g),$$

and therefore verifying Equation 16 is equivalent with checking if $\beta_{i-1}^{s+h(\alpha_{i-1})}=a_i$ holds, which is exactly what one wants. Also, the client verifies the global bilinear digest against the locally stored digest d, namely that the relation e(d,g)=e($\beta_l$, $g^{s+h(\alpha_l)}$) holds. The client accepts only if all the relations above hold. As will be proven later, the qserver can forge a proof for an element y∉S with negligible probability in the security parameter k.

Security. Concerning security, the public key pk in the exemplary scheme (see Definition 4) consists of (or comprises) the bilinear pairings parameters t=(p, G, $G_M$, e, g) and the elements of $G_M$ g, $g^s$, $g^{s^2}$, ..., $g^{s^q}$ for some s chosen at random from $Z_p^*$. The adversary behaves in the same way as in the description of the security of the RSA accumulator.

Theorem 11 There exists a set-membership authentication scheme that combines the accumulation tree and the bilinear-map accumulator for authenticating a set of n elements that is secure under the q-strong Diftie-Hellman assumption and according to Definition 4.

Proof: The security of the new scheme that uses the bilinear-map accumulator can be proved in the same way it was proved for the RSA accumulator (Theorem 3) by using, instead of Lemma 1, Lemma 2.

Complexity. In the static case, one does not have to compute the witnesses each time one queries for an element. Namely, one can store the witnesses in the corresponding nodes of the tree and therefore reduce the query complexity from $O(n^\in)$ to $O(1)$ (since the depth of the tree is constant). The main result of this section follows.

Theorem 12 Let $0<\in<1$ be a fixed constant. Under the q-strong Diffie-Hellman assumption, one can use the accumulation tree and the bilinear-map accumulator with precomputed witnesses to authenticate a static set S of n elements in the three party model by storing a data structure of size $O(n)$ at both the source and the server such that:
1. The scheme is secure according to Definition 4;
2. The expected query time is $O(1)$;
3. The size of the proof is $O(1)$;
4. The verification time is $O(1)$;
5. The client keeps space $O(1)$.

Proof: Same as Theorem 4 with the difference that for the proof of security use Theorem 11.

Note that this result also applies in the two-party model, with the difference that there is no need to use the bilinear map to do the verification (the client knows the value s). Moreover, in the proof of the two-party model, there is no need to communicate both the hash value and the element in G, since the bilinear map function is not used. Finally, for verification, where one uses the $e(\cdot,\cdot)$ function, assume that the computation of $e(\cdot,\cdot)$ takes constant time (i.e., time that is does not depend on the number of elements in the hash table).

The following describes how to use the exemplary bilinear-map authentication structure that is based on the accumulation tree to authenticate a dynamic hash table. First described are the general algorithms and protocols for the three-party model, and then the results are extended to the two-party model where, as will be seen, more work is required to get the same complexity results as in the three-party model.

4.4 Three-Party Model

Let $0<\in<1$ be a fixed constant. Use the same separation technique as before and split the elements of the hash table into $O(n)$ buckets, each bucket containing $O(1)$ elements. The two differences identified between the RSA accumulator and the bilinear-map accumulator that can influence the complexity are as follows:
1. In the bilinear-map accumulator, one cannot compute witnesses on the fly with the straight-forward method (i.e., in $O(n)$ time by a series of exponentiations). This is because the "on-the-fly" witnesses computation, which should be done by the untrusted server, requires knowledge of the parameter s, which is kept secret for the sake of security;
2. Witness updates in the bilinear-map accumulator can be done in $O(n)$ time (see Theorem 3), as opposed to Lemma 4, where one uses an $O(n \log n)$ algorithm for the witness updates in the RSA accumulator.

Now presented is a useful lemma from [34] that is important for this solution.

Lemma 6 (Updating precomputed witnesses [34]) Let $S=\{x_1, x_2, \ldots, x_n\}$ where $x_i \in Z_p^*$. Let $V=g^{(x_1+s)(x_2+s) \cdots (x_n+s)}$ for some s and $W_i$ be the respective witness of $x_i$. Then the following hold:
1. If one adds an element $x_{n+1}$ to S, then for all $i=1, \ldots, n+1$ one has that $$W_i' = VW_i^{x_{n+1}-x_i}.$$

2. If one deletes an element $x_j$ from S, then for all $i \neq j$ one has that $$W_i' = \left(\frac{W_i}{V'}\right)^{\frac{1}{x_j-x_i}},$$

where V' is the bilinear digest of the updated set.

Recall that in the above lemma it is $$W_i = g^{\prod_{j \neq i}^{n}(x_j+s)}.$$

Using this lemma, one can derive the following corollary for the update time of the witnesses in the bilinear-map accumulator (since the computation of a witness takes constant time):

Corollary 3 (Witnesses updates in $O(n)$ time) Suppose one is given the bilinear pairings parameters $t=(p, G, G_M, e, g)$, the elements of $G_M g, g^s, g^{s^2}, \ldots, g^{s^q}$ for some s chosen at random from $Z_p^*$ and the set $S=\{x_1, x_2, \ldots, x_n\}$ where $x_i \in Z_p^*$, along with the witnesses $W_i$ for all $i=1, \ldots, n$. Let V be the bilinear digest of S, V' be the bilinear digest of S after an update has taken place (either insertion or deletion). Then, without the knowledge of s (and only by knowing V, V' and all the previous witnesses $W_i$), after an update, one can compute the new witnesses $W_i'$ in $O(n)$ time.

One now has the following result:

Theorem 13 Let $0 \in <1$ be a fixed constant. Under the q-strong Diffie-Hellman assumption, one can use the accumulation tree and the bilinear-map accumulator with precomputed witnesses to authenticate a dynamic hash table of n elements in the three-party model by storing a data structure of size $O(n)$ at both the source and the server such that:
1. The scheme is secure according to Definition 4;
2. The expected amortized update time at the server is $O(n^\in)$;
3. The expected amortized update time at the source is $O(1)$;
4. The expected query time is $O(1)$;
5. The size of the proof is $O(1)$;
6. The verification time is $O(1)$;
7. The client keeps space $O(1)$;
8. The update authentication information has size $O(1)$.

Proof: The security of the scheme is derived by Theorem 11. Doing now an analysis that is exactly the same with the analysis in Lemma 5 where instead of the $O(n \log n)$ algorithm of Lemma 4 one uses the $O(n)$ algorithm of Theorem 3 and one also uses a potential function that does not contain the logarithm factor, one can derive the main complexity result for the update time at the server. For the update time at the source, take advantage of the fact that the source knows the trapdoor (which in this case is the value s) and therefore can efficiently update the digests. The other results are derived as in Theorem 5. Finally, in order to implement non-membership queries, as in Theorem 5, one accumulates the cryptographic hashes $h(\cdot)$ of intervals $(y_i, y_{i+1})$, i.e., if there are three elements in the bucket, $y_1 < y_2 < y_3$, the bilinear digest of the bucket that also supports non-membership proofs will be $$g^{(h((-\infty,y1))+s)(h((y1,y2))+s)(h((y2,y3))+s)(h((y3,+\infty))+s)}.$$

Note that one important thing to achieve the O(n) witness updates without knowing s is that someone needs to know the new (updated) bilinear digest in order to use it in the formulas. As will be seen later, this can be computed in O(n) time. However, this is not needed for the three-party model, since the source, knowing s, can do that in constant time. Therefore, and referring back to the accumulation tree, whenever there is an update, the source sends to the server the updated bilinear digests along the path of the update. Then the server, knowing the previous bilinear digests and the previous witnesses at every node, can use Lemma 6 to compute the new witnesses.

4.5 Two-Party Model

As seen in the previous section, in order to achieve efficient witnesses updates by using Theorem 3, one needs to know the updated bilinear digest after the update has taken place. This was easy in the three-party model, since the entity that computes the witnesses (i.e., the untrusted server) could receive the updated digests from the trusted source, without increasing the update authentication information. However, in the two party model, the untrusted server has to perform this itself, without knowing the trapdoor information s. In the following it is shown how one can do that in O(n) time, by using Viéte's formulas [43].

Suppose one has a set of elements $S=\{x_1, x_2, \ldots, x_n\}$ and the respective bilinear digest $$\psi(S) = g^{\prod_{i=1}^{n}(x_i+s)}$$

for some s. Recall that the server has the elements $g, g^s, g^{s^2}, \ldots, g^{s^q}$, where $q \geq n$ is an upper bound to the number of elements that are going to be accumulated. Note now that the exponent of the bilinear digest is a n-degree polynomial in s and therefore can be written as $b_n s^n + b_{n-1} s^{n-1} + \ldots + b_1 s + b_0$ where $b_n = 1$ and thus the bilinear digest can be expressed as follows:

$$\psi(S) = g^{\prod_{i=1}^{n}(x_i+s)} = g^{b_0} \times (g^s)^{b_1} \times (g^{s^2})^{b_2} \times \ldots \times (g^{s^{n-1}})^{b_{n-1}} \times g^{s^n}. \quad (17)$$

Therefore, one way to compute the bilinear digest is by using $b_i$ and $g^{s^i}$. In this way, one can still compute the digest without the knowledge of s. From Viéte's formulas [43], one knows that $$b_{n-k} = \sum_{i_1, i_2, \ldots, i_k : i_1 < i_2 < \ldots < i_k} x_{i_1} x_{i_2} \ldots x_{i_k}.$$

Suppose now one is adding an element $x_{n+1}$ to the set. The new coefficients of the polynomial will be $a_{n+1}, a_n, \ldots a_0$ and they can be computed in O(n) time (therefore one does not have to do it from scratch which would be very expensive) by using the previous coefficients in the iterative relation $a_i = b_{i-1} + x_{n+1} b_i$ for $i=1, \ldots, n$. Note that $$a_0 = \prod_{j=1}^{n+1} x_j \text{ and } a_{n+1} = 1.$$

Similarly when one deletes an element $x_j$ one can compute the coefficients of the new polynomial $b_0, b_1, \ldots, b_n$ (from the coefficients $a_0, a_1, \ldots, a_{n+1}$) by setting $b_i = x_j^{-1}(a_i - b_{i-1})$ for $i=1, \ldots n$, where $$b_0 = \prod_{j=1}^{n} x_j,$$

which again is an O(n) computation. Finally, note that all the computations that refer to the exponent are reduced modulo p, the order of the multiplicative cyclic group.

Therefore in the two-party model, whenever there is an update, the server updates the coefficients of the polynomial (O(n) time), then computes the new digest by using Equation 17 (O(n)) and then updates the witnesses by using Theorem 3 (O(n)). When using the accumulation tree, however, all of these operations have to be performed $1/\in$ times on $O(n^\in)$ sets. Also, the server has to store the n coefficients of the current polynomial which, however, does not increase the asymptotic space needed. Therefore one has the following result:

Theorem 14 Let $0 < \in < 1$ be a fixed constant. Under the q-strong Diffie-Hellman assumption, one can use the accumulation tree and the bilinear-map accumulator with precomputed witnesses to authenticate a dynamic hash table of n elements in the two-party model by storing a data structure of size O(n) such that:
1. The scheme is secure according to Definition 4;
2. The expected amortized update time at the server is $O(n^\in)$;
3. The amortized update time at the client is O(1);
4. The query time is O(1);
5. The size of the verification proof is O(1);
6. The amortized size of the consistency proof is O(1);
7. The verification time is O(1);
8. The client keeps amortized space O(1).

Finally note that all of the algorithms for the update at the client side are the same as those described in Section 3.6. However, one important difference with the three party model is the fact that the verification can be done without the use of the $e(\cdot, \cdot)$ function since the client knows the value s (which also enables the client to do very efficient updates, i.e., in O(1) time). Also note that the server should not be holding all the elements $g, g^s, g^{s^2}, \ldots, g^{s^q}$ as this can be very space inefficient. The server can receive the appropriate values from the client whenever there is an insertion (i.e., when the set size increases from q to q+1 the client, along with the update query, also sends $g^{s^{q+1}}$) and the server can delete $g^{s^{q+1}}$ when the set size drops from q+1 to q.

5. Analysis and Evaluation

This section provides an evaluation of the two exemplary authenticated hash table structures. The computational efficiency of the schemes is analyzed by counting the number of modular exponentiations (in the appropriate group) involved in each of the complexity measures (namely, update, query and verification cost) and for general values of $\in$, the basic parameter in the schemes that controls the flatness of the accumulation tree. The number of exponentiations turns out to be a very good estimate of the computational complexity that the schemes have, mainly for two reasons. First, because modular exponentiations are the primitive operations performed in the authentication schemes, and, second, because there is no significant overheads due to hidden constant factors in the asymptotic complexities of the schemes—the only constant factors included in the complexities are well-understood functions of $\in$. Also, the communication complexity of the exemplary schemes is analyzed by computing the exact sizes of the verification proofs and the update authentication information. Finally, the computational and communication analysis are experimentally validated.

Below is evaluated the three-party—and most complete and representative—version of the exemplary schemes, namely the authenticated hash tables described in Theorems 5 and 13, where every complexity measure is constant, except from the update time that is $O(n^\in \log n)$ (RSA accumulator) and $O(n^\in)$ (bilinear-map accumulator) respectively. The experiments used a 64-bit, 2.8 GHz Intel based, dual-core, dual-processor machine with 2 GB main memory and 2 MB cache, running Debian Linux. For modular exponentiation, inverse computation and multiplication in the RSA-accumulator scheme, the experiments used NTL [1], a standard, optimized library for number theory, interfaced with C++. For bilinear maps and generic-group operations in the bilinear-accumulator scheme, the experiments used the PBC library [2], a library for pairing-based cryptography, interfaced with C. Finally, for both schemes, the experiments used the efficient sparsehash hash table implementation from Google (http://code.google.com/p/google-sparsehash/) for on-the-fly computation and efficient updates of the witnesses during a query or an update respectively.

5.1 Hash Table Using the RSA Accumulator

As seen in the system setup of the RSA-accumulator authenticated hash table, the standard scheme uses multiple RSA moduli $N_1, N_2, \ldots, N_l$, where the size of each modulus is increasing with $1/\in$. This experimental analysis makes use of the more practical version of the scheme that is described in Section 3.7. That is, restrict the input of each level of accumulation to be two times the output of a cryptographic hash function (e.g., SHA-256) plus a constant number of extra bits (t bits) that, when appended to the output of the hash function, give a prime number. For the experiments set t=9 and use a random oracle that outputs a value of length b=256 bits. Therefore, the exponent in the solution that uses the RSA accumulator is 2×256+9=521 bits. Note that t=9 is the smallest value satisfying Theorem 9 for b=256.

Primitive Operations. The main (primitive) operations used in the scheme are:
1. Exponentiation modulo N;
2. Computation of inverses modulo $\phi(N)$;
3. Multiplication modulo $\phi(N)$;
4. SHA-256 computation over 1024-bit integers.

Here are benchmarks for the time needed for these operations. For 200 runs, the average time for computing the power of a 1024-bit number to a 521-bit exponent and then reducing the result modulo N was found to be $T_1$=3.04 ms, and the average time for computing the inverse of a 521-bit number modulo $\phi(N)$ was $T_2$=0.000105 ms. Similarly, multiplication of 521-bit numbers modulo $\phi(N)$ was found to be $T_3$=0.0011 ms. For SHA-256, the standard C implementation from gcrypt.h was used and, over 200 runs, the time to compute the 256-bit digest of a 1024-bit number was found to be $T_4$=0.01 ms. Finally, the sparsehash query and update time was benchmarked and was found to be $t_{table}$=0.003 ms. As expected, exponentiations are the most expensive operations.

Updates. Let f be a function that takes as input a 1024-bit integer x and outputs 521-bit prime, as in Theorem 9. Make the reasonable assumption that the time for applying f(·) to x is dominated by the SHA-256 computation—practically ignoring the time to perform the appropriate shifting—and is thus equal to $T_4$=0.01 ms. As seen in the proof of Theorem 6, the updates are performed by the source as follows. Suppose the source wants to delete element x in bucket L. Let $d_1, d_2, \ldots, d_l$ be the RSA digests along the path from x to the root ($d_1$ is the RSA digest of the corresponding bucket and $d_l$ is the root RSA digest). The source first computes $d_1' = d_1^{f(x)^{-1}}$ mod N which is the new value of the bucket. Note that this is feasible to compute, since the source knows $\phi(N)$. Therefore so far, the source has performed one f(·) computation (actually the source has to do this f(·) computation only during insertions, since during deletions the value f(x) of the element x that is deleted has already been computed), one inverse computation and one exponentiation. Next, for each i=2, . . . , l, the source computes $d_i'$ by setting $$d_{i'} = d_i^{f(d_{i-1})^{-1} f(d'_{i-1})} \mod N.$$

Since $f(d_{i-1})$ is precomputed, the source has to do one f(·) computation, one inverse computation, one multiplication and one exponentiation. Therefore, the total update time at the source is $$t_{update}^{(source)} = T_1 + T_2 + T_4 + \in^{-1}(T_1 + T_2 + T_3 + T_4),$$

which is not dependent on n. During an update the server has to compute the witnesses explicitly and, therefore, perform $\in^{-1} n^\in \log n^\in$ exponentiations and $\in^{-1} f(\cdot)$ computations in total. Additionally, after the server has computed the new witnesses for each internal node of the accumulation tree, these witnesses have to be stored in a hash table. Therefore, $$t_{update}^{(server)} = (\in^{-1} + 1)(n^\in \log n^\in T_1 + T_4) + \in^{-1} n^\in + 1) t_{table}.$$

Verification. The verification is performed by doing $\in^{-1}+1$ exponentiations and f(·) computations. Namely, by using f(·) to compute prime representatives, Equation 5 becomes $\alpha_i = f(\beta_{i-1}^{\alpha_{i-1}} \mod N)$. This can be checked by cutting the last 9 bits of $\alpha_i$ and comparing the result (from which one also cuts the last 256 0's) with the SHA-256 digest of $\beta_{i-1}^{\alpha_{i-1}}$ mod N. Finally, the client has to perform one signature verification (i.e., to verify the signed digest from the source). Therefore, $$t_{verify} = (\in^{-1} + 1)(t_1 + t_4) + t_1, \quad (18)$$

which is also not dependent on n.

Queries. To answer queries using precomputed witnesses, the server just has to pick the right witness at each level. By using an efficient hash table structure with search time $t_{table}$ one has that $$t_{query} = (\in^{-1} + 1) t_{table}. \quad (19)$$

Communication complexity. The proof and the update authentication information consist of $\in^{-1}+1$ pairs of 1024-bit numbers and 521-bit f(·) values plus the signature of the digest from the source. Thus, $$s_{proof} = (\in^{-1} + 1)(1024 + 521) + 1024.$$

Finally, the update authentication information consists only of the bilinear digests that lie in the update path plus a signature, and, therefore, its size is $(\in^{-1}+1)1024+1024$ bits.

In order to precisely evaluate the practical efficiency of the scheme, set $\in$=0.1, 0.3, 0.5 (modeling the cases where the accumulation tree has 10, 3, 2 levels respectively). Table 2 below shows the various cost measures expressed as functions of $\in$, and the actual values these measures take on for a hash table that contains 100,000,000 elements and a varying value of $\in$ (i.e., varying number of levels of the RSA tree). One can make the following observations: As $\in$ increases, the verification time and the communication complexity decrease. However, update time increases since the internal nodes of the tree become larger and more exponentiations have to be performed. In terms of communication cost, the system is very efficient since only at most 2.25 KB have to be communicated.

TABLE 2

| operation | cost expression | $\epsilon = 0.1$ | $\epsilon = 0.3$ | $\epsilon = 0.5$ |
|---|---|---|---|---|
| source update (ms) | $T_1 + T_2 + T_4 +$ $\epsilon^{-1}(T_1 + T_2 + T_3 + T_4)$ | 33.56 | 13.22 | 9.15 |
| server update (ms) | $(\epsilon^{-1} + 1)(n^\epsilon \log n^\epsilon T_1 + T_4) +$ $(\epsilon^{-1} n^\epsilon + 1) t_{table}$ | 184.75 | 8680.60 | 398690.00 |
| verify (ms) | $(\epsilon^{-1} + 1)(T_1 + T_4) + T_1$ | 36.59 | 16.22 | 12.19 |
| query (ms) | $(\epsilon^{-1} + 1) t_{table}$ | 0.03 | 0.01 | 0.01 |
| proof size (KB) | $(\epsilon^{-1} + 1)(1024 + 521) + 1024$ | 2.25 | 0.97 | 0.70 |
| update info (KB) | $(\epsilon^{-1} + 1)1024 + 1024$ | 1.53 | 0.68 | 0.51 |

Table 2 shows the cost expressions in the exemplary RSA-accumulator scheme for n=100,000,000 and various values of $\in$. The size n of the hash table influences only the server's update time.

5.2 Hash Table Using the Bilinear-Map Accumulator

The analysis of the exemplary bilinear-accumulator scheme will use type A pairings, as described in [28]. These pairings are constructed on the curve $y^2=x^3+x$ over the base field $F_q$, where q is a prime number. The multiplicative cyclic group G being used is a subgroup of points in $E(F_q)$, namely a subset of those points of $F_q$ that belong to the elliptic curve E. Therefore this pairing is symmetric. The order of $E(F_q)$ is q+1 and the order of the group G is some prime factor p of q+1. The group of the output of the bilinear map $G_M$ is a subgroup of $F_{q^2}$.

In order to instantiate type A pairings in the PBC library, one must choose the size of the primes q and p. The main constraint in choosing the bit-sizes of q and p is that one wants to make sure that discrete logarithm is difficult in G (that has order p) and in $F_{q^2}$. Typical values are 160 bits for p and 512 bits for q. Since the accumulated elements in the construction are the output of SHA-256 (plus the trapdoor s), choose the size of p to be 260 bits. Use the typical value for the size of g, i.e., 512 bits. Note that with this choice of parameters the size of the elements in G (which have the form (x, y), i.e., points on the elliptic curve) is 1024 bits. The main operations benchmarked using PBC are the following:

1. Exponentiation of an element $X \in G$ to $y \in Z_p^*$, which takes $t_1=13.7$ ms;
2. Computation of inverses modulo p, which takes $t_2=0.0001$ ms;
3. Multiplication modulo p, which takes $t_3=0.0005$ ms;
4. SHA-256 computation of 1024-bit integers (elements of G), which takes $t_4=0.01$ ms;
5. Multiplication of two elements x, $y \in G$, which takes $t_5=0.04$ ms;
6. Bilinear map computation e(x, y), where x, $y \in G$, which takes $t_6=13.08$ ms.

Note that operations related to bilinear-map accumulators take significantly more time than the respective operations related to the RSA accumulator.

By following a similar method with that followed for the RSA accumulator, one is able to derive formulas for the exact times of the bilinear-map accumulator (see Table 3). The main differences in the cost expressions are in the server's update time, where the witnesses are computed in a different way (in addition to exponentiations, multiplications and inverse computations are also required) and in the client's verification time, where two bilinear-map computations are also performed.

TABLE 2

| operation | cost expression | $\epsilon = 0.1$ | $\epsilon = 0.3$ | $\epsilon = 0.5$ |
|---|---|---|---|---|
| source update (ms) | $t_1 + t_2 + t_4 +$ $\epsilon^{-1}(t_1 + t_2 + t_3 + t_4)$ | 150.82 | 59.41 | 41.13 |
| server update (ms) | $(\epsilon^{-1} + 1)[n^\epsilon(t_1 + t_2 + t_3) +$ $t_4] + (\epsilon^{-1} n^\epsilon + 1) t_{table}$ | 951.20 | 14915.00 | 411080.00 |
| verify (ms) | $(\epsilon^{-1} + 1)(t_1 + t_4 + 2t_6) +$ $T_1$ | 441.61 | 175.81 | 122.65 |
| query (ms) | $(\epsilon^{-1} + 1) t_{table}$ | 0.03 | 0.01 | 0.01 |
| proof size (KB) | $(\epsilon^{-1} + 1)(1024 + 1024) +$ 1024 | 2.94 | 1.24 | 0.89 |
| update info (KB) | $(\epsilon^{-1} + 1)1024 + 1024$ | 1.53 | 0.68 | 0.51 |

Table 2 shows cost expressions in the exemplary scheme bilinear-accumulator scheme for n=100,000,000 and various values of $\in$. The size n of the hash table influences only the server's update time.

5.3 Comparison

Figure 3:
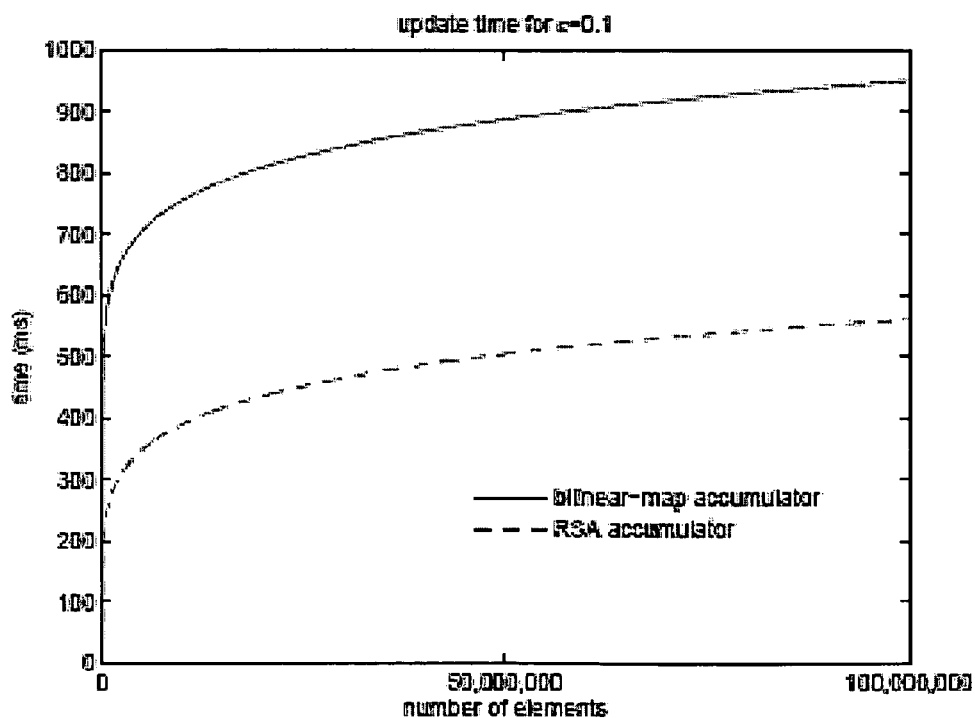
FIG. 3 shows a comparison of update time for $\varepsilon=0.1$ between the exemplary bilinear-map accumulator and the exemplary RSA accumulator.

FIG. 3 shows a comparison of update time for $\in=0.1$ between the exemplary bilinear-map accumulator and the exemplary RSA accumulator.

As can be seen from the experimental evaluation, the RSA-accumulator scheme is more efficient in practice than the bilinear-map accumulator scheme. This is due to the costly operations of applying the bilinear-map function $e(\cdot, \cdot)$ and performing exponentiations in the field G. However, asymptotically, the bilinear-accumulator scheme outperforms the RSA-accumulator scheme by a logarithmic factor. In terms of communication efficiency, one can see that there is almost no difference since the size of the elements of the field G is 1024 bits, equal to the size of the RSA modulus used in the RSA-accumulator scheme. Note that for a system implementation of the exemplary schemes it would make sense to make the constant $\in$ as small as possible since the update cost may become prohibitive for large values of $\in$. In FIG. 2, one can see how the update time scales with increasing number of elements in the hash table, for both authentication schemes. Here, observe that for $\in=0.1$, the RSA-accumulator scheme is far more efficient than the bilinear-accumulator scheme.

Overall, the results are primarily of theoretical interest. From the evaluation, one can see that the cost for performing an update is much higher than the cost induced by using Merkle trees and other structures, such as skip lists (see for example [18]). However, the communication complexity scales very well with the data set size and compares well with the hash-based methods. The most important property of these results is that asymptotically the client can optimally authenticate operations on hash tables with constant time and communication complexities. This makes the exemplary schemes suitable for certain applications where, for example, verification should not depend on the size of the data being authenticated.

6. Conclusions

Herein are proposed new, provably secure, cryptographic constructions for authenticating the fundamental hash-table functionality. Nested cryptographic accumulators are used on a tree of constant depth to achieve constant query and verification costs and sublinear update costs. These results are applicable to both the two-party and three-party data authentication models. The exemplary methods are used to authenticate general set-membership queries and overall improve over previous techniques that use cryptographic accumulators, reducing the main complexity measures to constant, yet keeping sublinear update time.

An important open problem (i.e., further consideration) is whether one can achieve logarithmic update cost and still keep the communication complexity constant. Note that achieving constant complexity for all the complexity measures is unfeasible for the two-party model due to the $\Omega(\log n/\log \log n)$ memory checking lower bound [15] on query complexity (the sum of read and write complexity). This result, however, motivates seeking better lower bounds for set-membership authentication (as, e.g., in [15, 41]): given a cryptographic primitive or authentication model, what is the best one can do in terms of complexity (and still being provably secure)? It would be interesting to modify the exemplary schemes to obtain non-amortized bounds for updates using, e.g., Overmar's global rebuilding technique [36].

7. References

Following is a list of references referred to elsewhere herein.

[1] NTL: A library for doing number theory. http://www.shoup.net/ntl/.

[2] PBC: The pairing-based cryptography library. http://crypto.stanford.edu/pbc/.

[3] G. Ateniese, R. Burns, R. Curtmola, J. Herring, L. Kissner, Z. Peterson, and D. Song. Provable data possession at untrusted stores. In *Proc. Computer and Communication Security (CCS)*, 2007.

[4] N. Buie and B. Pfitzmann. Collision-free accumulators and fail-stop signature schemes without trees. In *Advances in Cryptology: Proc. EUROCRYPT*, volume 1233 of *LNCS*, pages 480-494. Springer-Verlag, 1997.

[5] M. Bellare and P. Rogaway. Random oracles are practical: A paradigm for designing efficient protocols. In *Proceedings of the 1st ACM Conference on Computer and Communications Security*, pages 62-73. ACM Press, 1993.

[6] J. Benaloh and M. de Mare. One-way accumulators: A decentralized alternative to digital signatures. In *Advances in Cryptology—EUROCRYPT 93*, volume 765 of *LNCS*, pages 274-285. Springer-Verlag, 1993.

[7] M. Blum, W. S. Evans, P. Gemmell, S. Kannan, and M. Naor. Checking the correctness of memories. *Algorithmica*, 12(2/3):225-244, 1994.

[8] D. Boneh and X. Boyen. Short signatures without random oracles and the SDH assumption in bilinear groups. *J. Cryptology*, 21(2):149-177, 2008.

[9] A. Buldas, P. Laud, and H. Lipmaa. Accountable certificate management using undeniable attestations. In *ACM Conference on Computer and Communications Security*, pages 9-18. ACM Press, 2000.

[10] J. Camenisch, M. Kohlweiss, and C. Soriente. An accumulator based on bilinear maps and efficient revocation for anonymous credentials. In *Public Key Cryptography (PKC)*, pages 481-500, 2009.

[11] J. Camenisch and A. Lysyanskaya. Dynamic accumulators and application to efficient revocation of anonymous credentials. In *Proc. CRYPTO*, 2002.

[12] I. L. Carter and M. N. Wegman. Universal classes of hash functions. In *Proc. ACM Symp. on Theory of Computing*, pages 106-112, 1977.

[13] T. H. Cormen, C. E. Leiserson, R. L. Rivest, and C. Stein. *Introduction to Algorithms*. MIT Press, Cambridge, Mass., 2nd edition, 2001.

[14] M. Dietzfelbinger, A. Karlin, K. Mehlhorn, F. Meyer auf der Heide, H. Rohnert, and R. E. Tarjan. Dynamic perfect hashing: upper and lower bounds. *SIAM J. Comput.*, 23:738-761, 1994.

[15] C. Dwork, M. Naor, G. N. Rothblum, and V. Vaikuntanathan. How efficient can memory checking be? In *TCC*, pages 503-520, 2009.

[16] C. Erway, A. Küpçü, C. Papamanthou, and R. Tamassia. Dynamic provable data possession. In *Proc. ACM Int. Conference on Computer and Communications Security (CCS)*, 2009.

[17] R. Gennaro, S. Halevi, and T. Rabin. Secure hash-and-sign signatures without the random oracle. In *Proc. EUROCRYPT*, volume 1592 of *LNCS*, pages 123-139. Springer-Verlag, 1999.

[18] M. T. Goodrich, C. Papamanthou, and R. Tamassia. On the cost of persistence and authentication in skip lists. In *Proc. Int. Workshop on Experimental Algorithms (WEA)*, pages 94-107, 2007.

[19] M. T. Goodrich, C. Papamanthou, R. Tamassia, and N. Triandopoulos. Athos: Efficient authentication of outsourced file systems. In *Proc. Information Security Conference*, LNCS, pages 80-96. Springer, 2008.

[20] M. T. Goodrich, R. Tamassia, and J. Hasic. An efficient dynamic and distributed cryptographic accumulator. In *Proc. of Information Security Conference (ISC)*, volume 2433 of *LNCS*, pages 372-388. Springer-Verlag, 2002.

[21] M. T. Goodrich, R. Tamassia, and A. Schwerin. Implementation of an authenticated dictionary with skip lists and commutative hashing. In *Proc. DARPA Information Survivability Conference and Exposition II (DISCEX II)*, pages 68-82, 2001.

[22] M. T. Goodrich, R. Tamassia, and N. Triandopoulos. Super-efficient verification of dynamic outsourced databases. In *Proc. RSA Conference, Cryptographers' Track (CT-RSA)*, volume 4964 of *LNCS*, pages 407-424. Springer, 2008.

[23] M. T. Goodrich, R. Tamassia, N. Triandopoulos, and R. Cohen. Authenticated data structures for graph and geometric searching. In *Proc. RSA Conference—Cryptographers' Track*, pages 295-313. Springer, LNCS 2612, 2003.

[24] A. Hutflesz, H.-W. Six, and P. Widmayer. Globally order preserving multidimensional linear hashing. In *Proc. 4th Intl. Conf. on Data Engineering*, pages 572-579, 1988.

[25] C. M. Kenyon and J. S. Vitter. Maximum queue size and hashing with lazy deletion. *Algorithmica*, 6:597-619, 1991.

[26] J. Li, N. Li, and R. Xue. Universal accumulators with efficient nonmembership proofs. In *ACNS, pages* 253-269, 2007.

[27] N. Linial and O, Sasson. Non-expansive hashing. In *Proc. 28th Annu. ACM Sympos. Theory Comput.*, pages 509-517, 1996.

[28] B. Lynn. *On the implementation of pairing-based cryptosystems*. PhD thesis, Stanford University, November 2008.

[29] C. Martel, G. Nuckolls, P. Devanbu, M. Gertz, A. Kwong, and S. G. Stubblebine. A general model for authenticated data structures. *Algorithmica*, 39(1):21-41, 2004.

[30] R. C. Merkle. A certified digital signature. In G. Brassard, editor, *Proc. CRYPTO '89*, volume 435 of *LNCS*, pages 218-238. Springer-Verlag, 1989.

[31] J. K. Mullin. Spiral storage: Efficient dynamic hashing with constant-performance. *Comput. J.*, 28:330-334, 1985.

[32] M. Naor and K. Nissim. Certificate revocation and certificate update. In *Proc. 7th USENIX Security Symposium*, pages 217-228, Berkeley, 1998.

[33] M. Naor and G. N. Rothblum. The complexity of online memory checking. *J. ACM*, 56(1), 2009.

[34] L. Nguyen. Accumulators from bilinear pairings and applications. In *Proc. CT-RSA* 2005, *LNCS* 3376, pp. 275-292, *Springer-Verlag*, 2005, 2005.

[35] G. Nuckolls. Verified query results from hybrid authentication trees. In *DBSec*, pages 84-98, 2005.

[36] M. H. Overmars. *The Design of Dynamic Data Structures*, volume 156 of *Lecture Notes Comput. Sci.* Springer-Verlag, Heidelberg, West Germany, 1983.

[37] C. Papamanthou and R. Tamassia. Time and space efficient algorithms for two-party authenticated data structures. In *Proc. Int. Conference on Information and Communications Security (ICICS)*, volume 4861 of *LNCS*, pages 1-15. Springer, 2007.

[38] T. Sander. Efficient accumulators without trapdoor (extended abstract). In *ICICS '99: Proc. Int. Conf. on Information and Communication Security*, pages 252-262. Springer-Verlag, 1999.

[39] T. Sander, A. Ta-Shma, and M. Yung. Blind, auditable membership proofs. In *Proc. Financial Cryptography (FC 2000)*, volume 1962 of *LNCS*. Springer-Verlag, 2001.

[40] R. Tamassia. Authenticated data structures. In *Proc. European Symp. on Algorithms*, volume 2832 of *LNCS*, pages 2-5. Springer-Verlag, 2003.

[41] R. Tamassia and N. Triandopoulos. Computational bounds on hierarchical data processing with applications to information security. In *Proc. Int. Colloquium on Automata, Languages and Programming (ICALP)*, volume 3580 of *LNCS*, pages 153-165. Springer-Verlag, 2005.

[42] R. Tamassia and N. Triandopoulos. Efficient content authentication in peer-to-peer networks. In *Proc. Int. Conf. on Applied Cryptography and Network Security (ACNS)*, volume 4521 of *LNCS*, pages 354-372. Springer, 2007.

[43] E. B. Vinberg. *A course in algebra*. American Mathematical Society, Providence R.I., 2003.

[44] P. Wang, H. Wang, and J. Pieprzyk. A new dynamic accumulator for batch updates. In *ICICS*, pages 98-112, 2007.

8. Further Aspects

For purposes of clarity, a few definitions will be discussed below. It is believed that these parallel what is known to one of ordinary skill in the art, and this conventional meaning/understanding is not controverted by the below definitions.

RSA is an algorithm for public-key cryptography [45].

Hash trees or Merkle trees are a type of data structure which contains a tree of summary information about a larger piece of data (e.g., a file) used to verify its contents. A hash tree is a tree of hashes in which the leaves are hashes of data blocks in, for instance, a file or set of files. Nodes further up in the tree are the hashes of their respective children. Usually, a cryptographic hash function such as SHA-1, Whirlpool, or Tiger is used for the hashing. If the hash tree only needs to protect against unintentional damage, much less secure checksums such as cyclic redundancy checks (CRCs) can be used.

The top of a hash tree has a top hash (or root hash or master hash). As an example, before downloading a file on a p2p network, in most cases the top hash is acquired from a trusted source, for instance a friend or a web site that is known to have good recommendations of files to download. When the top hash is available, the hash tree can be received from any non-trusted source, such as any peer in the p2p network. Then, the received hash tree is checked against the trusted top hash, and if the hash tree is damaged or fake, another hash tree from another source will be tried until the program finds one that matches the top hash.

A hash function is a well-defined procedure or mathematical function that converts a large amount of data into a small datum (e.g., a single integer) that may be used as an index (e.g., in an array or other data structure). Hash functions are often used to speed up table lookup or data comparison tasks.

The following is a list of exemplary cryptographic hashes: elf64, HAVAL, MD2, MD4, MD5, Radio Gatun, RIPEMD-64, RIPEMD-160, RIPEMD-320, SHA-1, SHA-256, SHA-384, SHA-512, Skein, Tiger and Whirlpool.

Note that any suitable hash function may be used with the exemplary embodiments of the invention. In some exemplary embodiments, the selection of a particular hash function may depend on the intended use and/or desired attributes of the system (e.g., in view of the attributes of the hash function, such as length and cost, for example).

A skip list is a data structure for storing a sorted list of items using a hierarchy of linked lists that connect subsequences of the items. These auxiliary lists enable item lookup with greater efficiency as compared with a balanced binary search tree (i.e., with a number of probes proportional to log n instead of n).

A skip list is built in layers, also referred to herein as levels. A search for a target element (e.g., value) begins at the head element (i.e., root node) in the top list and proceeds horizontally until the current element is greater than or equal to the target. If the current element is equal to the target, it has been found. If the current element is greater than the target, the procedure is repeated after returning to the previous element and dropping down vertically to the next lower list (the next level down). Note that nodes of a skip list generally correspond to an interval of values and, thus, nodes of a skip list may be seen to have an interval value associated with the respective node.

Both a skip list and a hash tree (the "list/tree") are considered herein to be organizational structures having a generally tree-like structure comprised of nodes. A root node (e.g., located at the top or root of the hash tree or at the top left or root of the skip list) leads to one or more internal nodes and/or zero or more leaf nodes. The internal nodes lead to zero or more other internal nodes and/or one or more leaf nodes. The leaf nodes are located at the very bottom of the list/tree (e.g., at the bottommost level/layer). Data (e.g., one or more files, collections of files, directories, file systems) or portions of data are stored in accordance with the leaf nodes, as noted above. The root node, internal nodes and/or leaf nodes may lead to another node on the same level/layer (particularly for skip lists). The nodes of the list/tree each have a hash value associated with the node. For purposes of convenience and discussion, the nodes of the list/tree may be referred to using a label (e.g., $v_i$ or $w_j$). Two nodes are considered linked within the list/tree if there is a connection pointing from one node to the other node.

In some exemplary embodiments, links between nodes are either pointing from one node to another node at the same level or pointing from one node to another node at a lower level.

Any reference to one or more "buckets" should be construed as a general grouping of the respective entities (e.g., elements).

Reference with regard to cryptographic accumulators, i.e., definitions, constructions and applications thereof, generally may be made to [47]. It is believed that one of ordinary skill in the art will understand the terms "accumulator", "RSA accumulator," "bilinear-map accumulator" and "prime representative," and further will understand and appreciate the various techniques utilized in conjunction with these entities.

9. Further References

Following is a list of further references that may be of interest with respect to the subject matter discussed herein.

[45] C. Papamanthou, R. Tamassia, and N. Triandopoulos. Authenticated hash tables. In *ACM CCS*, pages 437-448, 2008.

[46] WO 2008/147400 (Intl. Appl. No. PCT/US2007/024642), "Authentication For Operations Over An Outsourced File System Stored By An Untrusted Unit," Tamassia et al., filed Nov. 30, 2007 (priority date Nov. 30, 2006), published Dec. 4, 2008.

[47] N. Fazio and A. Nicolosi. Cryptographic Accumulators: Definitions, Constructions and Applications. Class G22.3033-010—Topics in Cryptography, Fall 2002.

WO 2007/087363 (Intl. Appl. No. PCT/US2007/001928), "Efficient Content Authentication In Peer-To-Peer Networks," Tamassia et al., filed Jan. 24, 2007 (priority dates Jan. 24, 2006 and Jul. 28, 2006), published Aug. 2, 2007.

WO 2008/014002 (Intl. Appl. No. PCT/US2007/017042), "Super-Effiicient Verification Of Dynamic Outsourced Databases," Goodrich et al., filed Jul. 30, 2007 (priority date Jul. 28, 2006), published Jan. 31, 2008.

WO 2008/014004 (Intl. Appl. No. PCT/US2007/017046), "Load-Balanced Distributed Authentication Structures," Goodrich et al., filed Jul. 30, 2007 (priority date Jul. 28, 2006), published Jan. 31, 2008.

WO 2008/014007 (Intl. Appl. No. PCT/US2007/017072), "Certification And Authentication Of Data Structures," Tamassia et al., filed Jul. 31, 2007 (priority date Jul. 28, 2006), published Jan. 31, 2008.

Intl. Appl. No. PCT/US2009/004322, "Apparatus, Methods, And Computer Program Products Providing Dynamic Provable Data Possession," Erway et al., filed Jul. 24, 2009 (priority date Jul. 25, 2008).

10. Further Exemplary Embodiments

Below are described various further non-limiting, exemplary embodiments of the invention. It should be noted that the exemplary embodiments described below may be utilized in conjunction with one or more of the aspects and/or attributes described above, and in any suitable and/or practicable combination.

FIG. 3 illustrates a simplified block diagram of various exemplary electronic devices that are suitable for use in practicing the exemplary embodiments of this invention. FIG. 3 shows a system 100 having a client 102 and a server 112.

The client 102 has at least one data processor (DP) 104 and at least one memory (MEM) 106 coupled to the DP 104. The client 102 is configured for bidirectional communication with the server 412, for example, using one or more communication components, such as a transceiver or modem (not shown). The MEM 106 stores information (INFO) 110 in accordance with exemplary embodiments of the invention, as further described herein. As non-limiting examples, the INFO 110 may comprise one or more files, one or more dictionaries (e.g., authenticated dictionaries), one or more data files (e.g., skip lists, skip list information, hash values) used for security purposes (e.g., authentication, verification), one or more file systems or file collections and/or other information, data or files, as non-limiting examples. The client 102 may comprise any suitable electronic device, including stationary and portable computers, as non-limiting examples. The client 102 may comprise additional components and/or functions. For example, the client 102 may include one or more user interface (UI) elements, such as a display, a keyboard, a mouse or any other such UI components, as non-limiting examples. As a further non-limiting example, the client 102 may comprise a communication component (e.g., a transceiver, a modem) that enables communication with one or more other devices, such as the server 112, for example.

The server 112 has at least one data processor (DP) 114 and at least one memory (MEM) 116 coupled to the DP 114. The server 112 is configured for bidirectional communication with the client 402, for example, using one or more communication components, such as a transceiver or modem (not shown). The MEM 116 stores a file system (FS) 120 and an authentication service (AS) 122 in accordance with exemplary embodiments of the invention, as further described herein. In some exemplary embodiments, the functionality of the FS 120 and AS 122 may be stored in or provided by a single component, such as a memory, a circuit, an integrated circuit or a processor, as non-limiting examples. Note that in other exemplary embodiments, the functionality of the FS 120 and AS 122 may be stored in or provided by separate components (e.g., two or more memories, two or more circuits, two or more integrated circuits, two or more processors). The MEM 116 of the server 112 may store additional information or data, such as one or more files, one or more dictionaries (e.g., authenticated dictionaries), one or more digests, one or more accumulation values, one or more authentication structures (e.g., one or more accumulation trees), one or more data files (e.g., skip lists, skip list information, hash values, authentication structures, accumulation trees, accumulation values) used for security purposes (e.g., authentication, verification), one or more file systems or file collections and/or other information, data or files, as non-limiting examples. The server 112 may comprise any suitable electronic device, including stationary and portable computers, as non-limiting examples. The server 112 may comprise additional components and/or functions. For example, the server 112 may include one or more user interface (UI) elements, such as a display, a keyboard, a mouse or any other such UI components, as non-limiting examples. As a further non-limiting example, the server 112 may comprise a communication component (e.g., a transceiver, a modem) that enables communication with one or more other devices, such as the client 102, for example. In some exemplary embodiments, the server 112 may be considered an untrusted remote server storing data on behalf of and for access by the client 102.

As a non-limiting example, the server 112 may store data (e.g., one or more file systems) using one or more accumulation trees, as non-limiting examples. As a non-limiting example, the client 102 may be configured to access data stored by the server 112, such as data stored in one or more accumulation trees, for example. In further exemplary embodiments, there may be one or more nodes (e.g., relay nodes) disposed between the client 102 and the server 112. In such exemplary embodiments, the client 102 may communicate with the server 112 via the one or more intermediate nodes.

The exemplary embodiments of this invention may be carried out by computer software implemented by the one or more of the DPs 104, 114 or by hardware, or by a combination of hardware and software. As a non-limiting example, the exemplary embodiments of this invention may be implemented by one or more integrated circuits. The MEMs 106, 116 may be of any type appropriate to the technical environment and may be implemented using any appropriate data storage technology, such as optical memory devices, magnetic memory devices, semiconductor-based memory devices, fixed memory and removable memory, as non-limiting examples. The DPs 104, 114 may be of any type appropriate to the technical environment, and may encompass one or more of microprocessors, general purpose computers, special purpose computers and processors based on a multi-core architecture, as non-limiting examples.

Exemplary embodiments of the invention or various aspects thereof, such as the authentication service, as a non-limiting example, may be implemented as a computer program stored by the respective MEM 106, 116 and executable by the respective DP 104, 114.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments. The exemplary embodiments of the invention, including those described immediately below, may be practiced, utilized or implemented in any combination (e.g., any combination that is practicable, feasible and/or suitable) and are not limited to only those combinations included in the appended claims and/or described herein.

(1) In one exemplary embodiment, an apparatus comprising: at least one memory configured to store data; and at least one processor configured to perform operations on the stored data, where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

An apparatus as above, where the accumulator comprises a RSA accumulator or a bilinear-map accumulator. An apparatus as in any above, where a communication complexity for the accumulation tree is constant. An apparatus as in any above, where at least one of an update time and a query time for the accumulation tree is maintained to be sublinear. An apparatus as in any above, where the digest comprises an accumulation value of the stored data. An apparatus as in any above, where membership proofs of size proportional to the depth of the accumulation tree are verified using the digest. An apparatus as in any above, where the apparatus comprises a remote server configured to store the data on behalf of a client or a source. An apparatus as in any above, where each of the at least one leaf nodes is located at a same level within the accumulation tree.

An apparatus as in any above, where for each leaf node $v$ in the accumulation tree $T(\in)$ that lies at level 0 and stores element $e$ of the stored data, set the accumulation value $\chi(v)$ of the leaf node to $\chi(v)=e$. An apparatus as in any above, where for each non-leaf node $v$ in the accumulation tree $T(\in)$ that lies in level $1 \leq i \leq l$, set the accumulation value $\chi(v)$ of the node $v$ to $\chi(v)=g_i^{\prod_{u \in N(v)} r_i(\chi(u))} \bmod N$ where $r_i(\chi(u))$ is a prime representative of $\chi(u)$ computed using function $h_i$, $N(v)$ is a set of children of the node $v$ and $g_i \in QR_{N_i}$. An apparatus as in any above, where the accumulation values of the root node and the at least one internal node are determined by hierarchically employing an accumulator over subsets of the accumulation tree, where each subset comprises a subtree of nodes rooted at the node for which the accumulation value is determined.

An apparatus as in any above, where the accumulation tree is generated or maintained in conjunction with an authenticated hash table having $O(n)$ buckets, each bucket containing $O(1)$ elements of the stored data, where the accumulation tree is constructed over the buckets, where a size of each bucket is constant, where each leaf node of the accumulation tree holds the prime representative of the accumulation value of the elements in the bucket corresponding to the leaf node. An apparatus as in the previous, where for an update operation with respect to at least one bucket of the authenticated hash table, a new value of the at least one bucket is computed and accumulation values for all nodes in a path from the bucket to the root node are computed, where the update operation comprises at least one of inserting at least one new element and deleting at least one element. An apparatus as in the previous, where the apparatus comprises a server, where in a three-party model for a system comprised of a source, the apparatus and a client the source is configured to perform the update operation on a locally stored copy of the stored data and to send update information to the apparatus, where in a two-party model for a system comprised of the apparatus and a client the apparatus is configured to perform the update operation on the stored data.

An apparatus as in any above, where the apparatus is further configured to receive a query on the stored data and to return, in response to the received query, an answer and a corresponding verification proof. An apparatus as in the previous, where the verification proof is an ordered sequence of tuples, each tuple comprised of a prime representative and a branch witness, where the branch witnesses authenticate every node of a path from a queried node to the root node of the accumulation tree. An apparatus as in the previous, where the branch witness $A_j^{(v)}$ of a non-leaf node $v$ of the accumulation tree is computed as $A_j^{(v)}=g_i^{\prod_{u \in N(v) - (j)} r_i(\chi(u))} \bmod N_i$ for every for every node $j \in N(v)$, where $\chi(u)$ is the accumulation value of node $u$, $r_i(\chi(u))$ is a prime representative of $\chi(u)$ computed using function $h_i$, $N(v)$ is a set of children of the non-leaf node $v$ and $g_i \in QR_{N_i}$.

An apparatus as in any above, where the apparatus comprises a server in a three-party model for a system comprised of a source, the apparatus and a client, where the source is configured to perform updates on a locally stored copy of the stored data and to send update information to the apparatus, where the client is configured to obtain and to store a signed copy of the digest from the source. An apparatus as in any above, where the apparatus comprises a server in a two-party model for a system comprised of the apparatus and a client, where the client locally stores and updates a copy of the digest, where the apparatus is further configured to receive an update for the stored data from the client, where in response to receiving the update the apparatus updates the stored data and sends a consistency proof to the client, where after sending the update to the apparatus the client is configured to recompute an updated digest based on the update.

An apparatus as in any above, where each leaf node has an associated witness that authenticates every node of a path from the leaf node to the root node, where the witnesses of the leaf nodes are precomputed such that the apparatus computes the witnesses in advance of a query and stores the precomputed witnesses. An apparatus as in any above, where each leaf node has an associated witness that authenticates every node of a path from the leaf node to the root node, where the witnesses of the leaf nodes are not precomputed such that the apparatus, in response to receiving a query on a node of the accumulation tree, computes the witnesses of every node in a path from the queried node to the root node of the accumulation tree.

An apparatus as in any above, where the accumulation tree with precomputed witnesses is configured to authenticate a static set S of n elements by storing a data structure of size $O(n)$ such that: an expected query time is $O(1)$, a size of the proof is $O(1)$, a verification time is $O(1)$, and a client keeps space $O(1)$. An apparatus as in any above, where the accumulation tree with precomputed witnesses is configured to authenticate a dynamic hash table of n elements by storing a data structure of size $O(n)$ such that: an expected amortized update time at the apparatus is $O(n^\epsilon \log n)$, an expected amortized update time at a source or a client is $O(1)$, an expected query time is $O(1)$, a size of a proof is $O(1)$, a verification time is $O(1)$, a client keeps space $O(1)$ and an update authentication information has size $O(1)$.

An apparatus as in any above, where the accumulation tree without precomputed witnesses is configured to authenticate a dynamic hash table of n elements by storing a data structure of size $O(n)$ such that: an expected amortized update time at the apparatus is $O(1)$, an expected amortized update time at a source or a client is $O(1)$, an expected query time is $O(n^\epsilon)$, a size of a proof is $O(1)$, a verification time is $O(1)$, a client keeps space $O(1)$ and an update authentication information has size $O(1)$. An apparatus as in any above, where the accumulation tree with precomputed witnesses is configured to authenticate a dynamic hash table of n elements by storing a data structure of size $O(n)$ such that: an expected amortized update time at the apparatus is $O(n^\epsilon)$, an expected amortized update time at a source or a client is $O(1)$, an expected query time is $O(1)$, a size of a proof is $O(1)$, a verification time is $O(1)$, a client keeps space $O(1)$ and an update authentication information has size $O(1)$.

An apparatus as in any above, further comprising one or more aspects of the exemplary embodiments of the invention as described in further detail herein.

Figure 5:
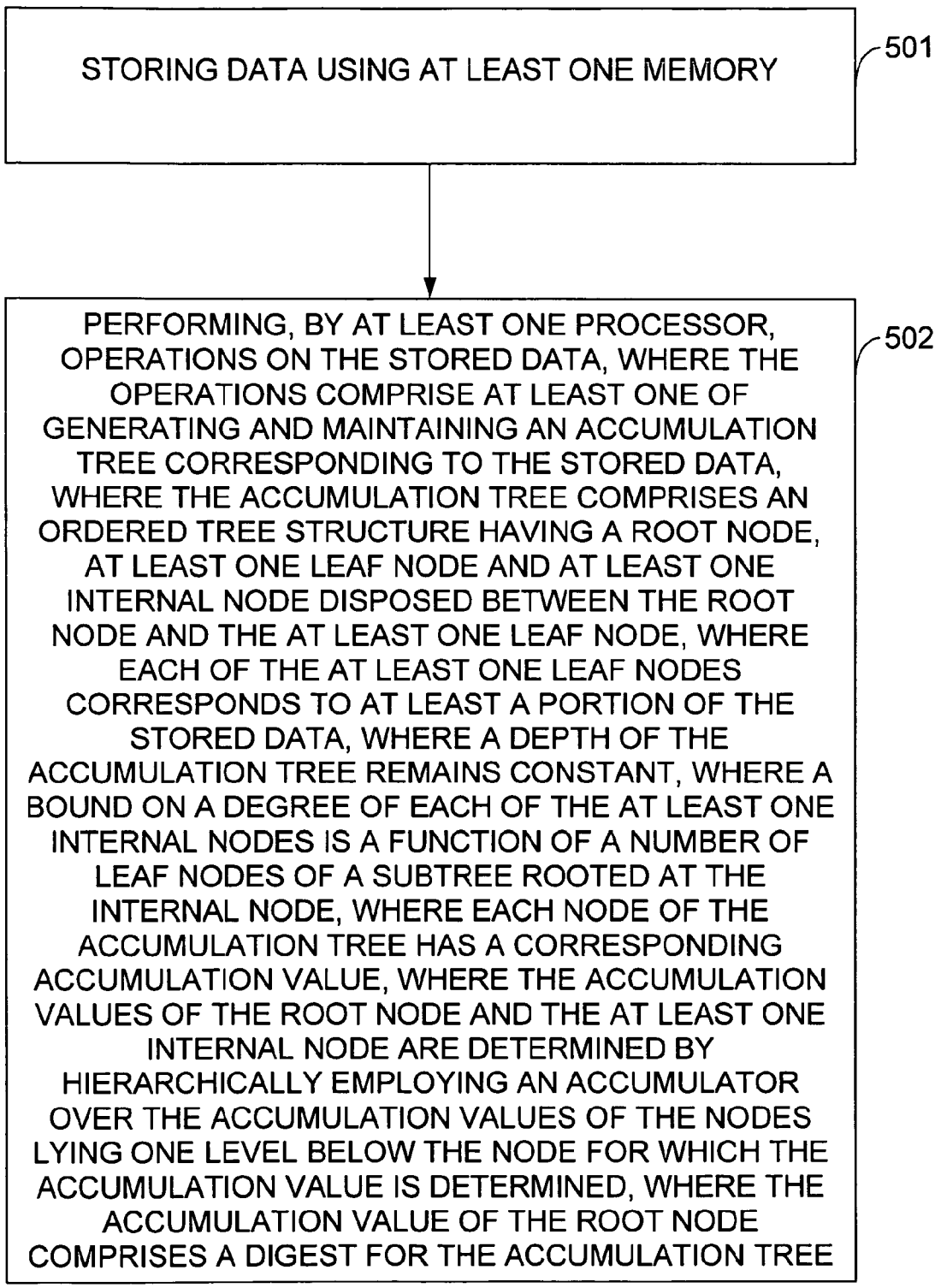
FIG. 5 depicts a flowchart illustrating one non-limiting example of a method for practicing the exemplary embodiments of this invention.

(2) In another exemplary embodiment, and as illustrated in FIG. 5, a method comprising: storing data using at least one memory (501); and performing, by at least one processor, operations on the stored data (502), where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

A method as above, further comprising one or more aspects of the exemplary embodiments of the invention as described in further detail herein.

(3) In a further exemplary embodiment, a program storage device readable by a machine, tangibly embodying a program of instructions executable by the machine for performing operations, said operations comprising: storing data; and performing actions on the stored data, where the actions comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

A program storage device as above, further comprising one or more aspects of the exemplary embodiments of the invention as described in further detail herein.

(4) In another exemplary embodiment, an apparatus comprising: means for storing data; and means for performing operations on the stored data, the operations comprising at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

An apparatus as above, where the means for storing comprises at least one memory and the means for performing operations comprises at least one processor. An apparatus as in any above, further comprising one or more aspects of the exemplary embodiments of the invention as described in further detail herein.

(5) In a further exemplary embodiment of the invention, an apparatus comprising: storage circuitry configured to store data; and processing circuitry configured to perform operations on the stored data, the operations comprising at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

An apparatus as in any above, further comprising one or more aspects of the exemplary embodiments of the invention as described in further detail herein.

(6) In another exemplary embodiment of the invention, an apparatus comprising: at least one memory (e.g., means for storing) configured to store at least a digest for an accumulation tree corresponding to data stored at another apparatus; at least one communications component (e.g., means for communicating, a transmitter, a transceiver, a modem) configured to enable the apparatus to communicate with the other apparatus; and at least one processor (e.g., means for processing, means for issuing a query) configured to send a query on the stored data, via the at least one communications component, to the other device, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises the digest for the accumulation tree.

An apparatus as above, where the at least one communications component is further configured to receive a response to the query, the response comprising an answer and a proof. An apparatus as in any above, further comprising one or more aspects of the exemplary embodiments of the invention as described in further detail herein.

(7) In a further exemplary embodiment, a method comprising: storing (e.g., using at least one memory) at least a digest for an accumulation tree corresponding to data stored at another apparatus; and sending a query on the stored data (e.g., by at least one processor, via at least one communications component) to the other device, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises the digest for the accumulation tree.

A method as in any above, further comprising one or more aspects of the exemplary embodiments of the invention as described in further detail herein. A program storage device readable by a machine, tangibly embodying a program of instructions executable by the machine for performing operations, said operations comprising steps of any of the above methods.

(8) A system comprising a first apparatus of (1), (4) or (5) and a second apparatus of (7). A system as above, further comprising one or more aspects of the exemplary embodiments of the invention as described in further detail herein.

The exemplary embodiments of the invention, as discussed above and particularly as described with respect to exemplary methods, may be implemented as a computer program product comprising program instructions embodied on a tangible computer-readable medium. Execution of the program instructions results in operations comprising steps of utilizing the exemplary embodiments or steps of the exemplary method.

The exemplary embodiments of the invention, as discussed above and as particularly described with respect to exemplary methods, may be implemented in conjunction with a program storage device (e.g., a computer-readable medium, a memory) readable by a machine (e.g., a computer, a portable computer, a device), tangibly embodying a program of instructions (e.g., a program, a computer program) executable by the machine (or by a processor of the machine) for performing operations. The operations comprise steps of utilizing the exemplary embodiments or steps of the exemplary method.

The blocks shown in FIG. 5 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as described herein.

In addition, the arrangement of the blocks depicted in FIG. 5 should be considered merely exemplary and non-limiting. It should be appreciated that the blocks shown in FIG. 5 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIG. 5 so as to implement one or more further exemplary embodiments of the invention.

That is, the exemplary embodiments of the invention shown in FIG. 5 may be utilized, implemented or practiced in conjunction with one or more further aspects in any combination (e.g., any combination that is suitable, practicable and/or feasible) and are not limited only to the steps, blocks, operations and/or functions shown in FIG. 5.

Still further, the various names used for the parameters and variables are not intended to be limiting in any respect, as these parameters may be identified by any suitable names.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As a non-limiting example, the exemplary techniques and constructions described herein may be utilized in conjunction with other kinds or types of accumulators and/or accumulation functions, such as a general accumulator definition, for example. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
at least one memory configured to store data; and
at least one processor configured to perform operations on the stored data, where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, and wherein the operations further comprise receiving a query on the stored data and to return, in response to the received query, an answer and a corresponding verification proof, where the verification proof is an ordered sequence of tuples, each tuple comprised of a prime representative and a branch witness, where the branch witnesses authenticate every node of a path from a queried node to the root node of the accumulation tree, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

2. The apparatus of claim 1, where a communication complexity for the accumulation tree is constant.

3. The apparatus of claim 1, where at least one of an update time and a query time for the accumulation tree is maintained to be sublinear.

4. The apparatus of claim 1, where for each non-leaf node $v$ in the accumulation tree $T(\in)$ that lies in level $1 \le i \le l$, set the accumulation value $\chi(v)$ of the node $v$ to $\chi(v) = g_i^{\prod_{u \in N(v)} r_i(\chi(u))} \mod N_i$, where $r_i(\chi(u))$ is a prime representative of $\chi(u)$ computed using function $h_i$, $N(v)$ is a set of children of the node $v$ and $g_i \in QR_{N_i}$.

5. The apparatus of claim 1, where the accumulation tree is generated or maintained in conjunction with an authenticated hash table having $O(n)$ buckets, each bucket containing $O(1)$ elements of the stored data, where the accumulation tree is constructed over the buckets, where a size of each bucket is constant, where each leaf node of the accumulation tree holds the prime representative of the accumulation value of the elements in the bucket corresponding to the leaf node.

6. The apparatus of claim 1, where the apparatus comprises a remote server configured to store the data on behalf of a client or a source.

7. The apparatus of claim 1, where the branch witness $A_j^{(v)}$ a non-leaf node $v$ of the accumulation tree is computed as $A_j^{(v)} g_i^{\prod_{u \in N(v) - \{j\}} r_i(\chi(u))} \mod N_i$ for every node $j \in N(v)$, where $\chi(u)$ is the accumulation value of node $u$, $r_i(\chi(u))$ is a prime representative of $\chi(u)$ computed using function $h_i$, $N(v)$ is a set of children of the non-leaf node $v$ and $g_i \in QR_{N_i}$.

8. The apparatus of claim 1, where the apparatus comprises a server in a three-party model for a system comprised of a source, the apparatus and a client, where the source is configured to perform updates on a locally stored copy of the stored data and to send update information to the apparatus, where the client is configured to obtain and to store a signed copy of the digest from the source.

9. The apparatus of claim 1, where the apparatus comprises a server in a two-party model for a system comprised of the apparatus and a client, where the client locally stores and updates a copy of the digest, where the apparatus is further configured to receive an update for the stored data from the client, where in response to receiving the update the apparatus updates the stored data and sends a consistency proof to the client, where after sending the update to the apparatus the client is configured to recompute an updated digest based on the update.

10. A method comprising:
storing data using at least one memory; and
performing, by at least one processor, operations on the stored data, where the operations comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, and wherein the operations further comprise receiving a query on the stored data and to return, in response to the received query, an answer and a corresponding verification proof, where the verification proof is an ordered sequence of tuples, each tuple comprised of a prime representative and a branch witness, where the branch witnesses authenticate every node of a path from a queried node to the root node of the accumulation tree, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

11. The method of claim 10, where a communication complexity for the accumulation tree is constant.

12. The method of claim 10, where at least one of an update time and a query time for the accumulation tree is maintained to be sublinear.

13. The method of claim 10, further comprising: verifying, using the digest, membership proofs of size proportional to the depth of the accumulation tree.

14. A program storage device readable by a machine, tangibly embodying a program of instructions executable by the machine for performing operations, said operations comprising:

storing data; and performing actions on the stored data, where the actions comprise at least one of generating and maintaining an accumulation tree corresponding to the stored data, where the accumulation tree comprises an ordered tree structure having a root node, at least one leaf node and at least one internal node disposed between the root node and the at least one leaf node, where each of the at least one leaf nodes corresponds to at least a portion of the stored data, where a depth of the accumulation tree remains constant, where a bound on a degree of each of the at least one internal nodes is a function of a number of leaf nodes of a subtree rooted at the internal node, and wherein the operations further comprise receiving a query on the stored data and to return, in response to the received query, an answer and a corresponding verification proof, where the verification proof is an ordered sequence of tuples, each tuple comprised of a prime representative and a branch witness, where the branch witnesses authenticate every node of a path from a queried node to the root node of the accumulation tree, where each node of the accumulation tree has a corresponding accumulation value, where the accumulation values of the root node and the at least one internal node are determined by hierarchically employing an accumulator over the accumulation values of the nodes lying one level below the node for which the accumulation value is determined, where the accumulation value of the root node comprises a digest for the accumulation tree.

15. The program storage device of claim 14, where a communication complexity for the accumulation tree is constant.

16. The program storage device of claim 14, where the digest comprises an accumulation value of the stored data.

17. The program storage device of claim 14, the operations further comprising: verifying, using the digest, membership proofs of size proportional to the depth of the accumulation tree.

* * * * *